us010726337B1

(12) United States Patent
Thibeault et al.

(10) Patent No.: US 10,726,337 B1
(45) Date of Patent: Jul. 28, 2020

(54) METHOD AND APPARATUS FOR EMULATION OF NEUROMORPHIC HARDWARE INCLUDING NEURONS AND SYNAPSES CONNECTING THE NEURONS

(71) Applicant: HRL LABORATORIES, LLC, Malibu, CA (US)

(72) Inventors: Corey M. Thibeault, Valley Village, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 626 days.

(21) Appl. No.: 15/143,466

(22) Filed: Apr. 29, 2016

Related U.S. Application Data

(60) Provisional application No. 62/155,420, filed on Apr. 30, 2015.

(51) Int. Cl.
  *G06N 3/10* (2006.01)
  *G06N 3/08* (2006.01)

(52) U.S. Cl.
  CPC ............... *G06N 3/10* (2013.01); *G06N 3/08* (2013.01)

(58) Field of Classification Search
  CPC ............ G06N 3/10; G06N 3/08; G06N 3/049; G06N 20/00; G06N 3/02; G06N 3/06
  See application file for complete search history.

(56) References Cited

U.S. PATENT DOCUMENTS

| | | | |
|---|---|---|---|
| 8,898,097 B2 * | 11/2014 | Brezzo ............... | G06N 3/049 706/33 |
| 8,930,291 B1 * | 1/2015 | Srinivasa ............. | G06N 3/063 706/15 |
| 8,959,040 B1 * | 2/2015 | Cruz-Albrecht ....... | G06N 3/049 706/39 |

(Continued)

OTHER PUBLICATIONS

Song et al., "Competitive Hebbian learning through spike-timing-dependent synaptic plasticity," Nature Neuroscience, 2000, 3 (9), pp. 919-926.

(Continued)

*Primary Examiner* — Khiem D Nguyen
(74) *Attorney, Agent, or Firm* — Lewis Roca Rothgerber Christie, LLP

(57) ABSTRACT

In a method for emulation of neuromorphic hardware on a computer processor, the neuromorphic hardware including computing circuits, the computing circuits including neurons and synapses connecting the neurons, the neurons being configured to communicate to each other through the synapses via spikes, the computing circuits being configured to execute in parallel in increments of time, the method includes, for each said time increment, emulating processing of the synapses, emulating processing of the neurons, and recording by the processor the next ones of the spikes for a subset of the neurons on a non-transitory physical medium. The processing of the synapses includes receiving previous ones of the spikes at presynaptic ends of the synapses, and transmitting the received previous ones of the spikes to postsynaptic ends of the synapses. The processing of the neurons includes receiving current ones of the spikes and generating next ones of the spikes.

14 Claims, 34 Drawing Sheets
(22 of 34 Drawing Sheet(s) Filed in Color)

(56) References Cited

U.S. PATENT DOCUMENTS

| | | | |
|---|---|---|---|
| 9,047,568 B1* | 6/2015 | Fisher | G06N 3/0472 |
| 9,311,596 B2* | 4/2016 | Izhikevich | G06N 3/049 |
| 9,412,051 B1* | 8/2016 | Chelian | G06N 3/0445 |
| 2009/0099989 A1* | 4/2009 | Ananthanarayanan | G06N 3/049 |
| | | | 706/44 |
| 2012/0109864 A1* | 5/2012 | Modha | G06N 3/063 |
| | | | 706/25 |
| 2014/0317035 A1* | 10/2014 | Szatmary | G06N 3/049 |
| | | | 706/27 |
| 2015/0134582 A1* | 5/2015 | Levin | G06N 3/04 |
| | | | 706/25 |
| 2015/0254532 A1* | 9/2015 | Talathi | G06F 16/583 |
| | | | 382/156 |
| 2015/0278628 A1* | 10/2015 | Agrawal | G06K 9/4647 |
| | | | 382/156 |
| 2016/0042271 A1* | 2/2016 | Yoon | G06N 3/04 |
| | | | 706/25 |
| 2016/0055409 A1* | 2/2016 | Majumdar | G06N 3/04 |
| | | | 706/20 |

OTHER PUBLICATIONS

Thibeault et al., "Analyzing large-scale spiking neural data with HRLAnalysis," Frontiers in Neuroinformatics, 2014, 8 (17), pp. 1-10.

\* cited by examiner

FIG. 4A

```
class Factory:
    def register(self, methodName, constructor, *args, **kargs):
        """register the constructor"""
        args = [constructor]
        args.extend(args)
        setattr(self, methodName, apply(Functor, args, kargs))

class Functor:
    def __init__(self, function, *args, **kargs):
        assert callable(function), "function should be a callable obj"
        self._function = function
        self._args = args
        self._kargs = kargs def __call__(self, *args, **kargs):
        """call function"""
        args = list(self._args)
        args.extend(args)
        _kargs = self._kargs.copy()
        _kargs.update(kargs)
        return apply(self._function, args, _kargs)
```

FIG. 4B

```
import collections
# start_idx:       The starting index in the Neuron list.
# stop_idx:        The stopping index in the Neuron list.
# is_subpopulation: Boolean to signal is this population is a subpopulation.
# parent:          The name of the parent population if this is a subpopulation.
Population = collections.namedtuple('Population',
                                    'start_idx, stop_idx, is_subpopulation, parent')

new_population = Population(0,10,False,None)
```

FIG. 4C

```python
def add_population(self, name=None, num_neurons=0,
                   neuron="LIF", neuron_params=None, neuron_type='excitatory'):

Perform error checking on the input parameters.

if neuron_type=='inhibitory':
        neuron_params['is_inhibitory'] = True
    else:
        neuron_params['is_inhibitory'] = False

# Create the population object.
    self.populations[name] = Population(len(self.networkstructures.neurons),
                                        len(self.networkstructures.neurons)+num_neurons-1,
                                        False, None)
    # Add a new list to the PopulationConns dictionary.
    self.populationConns[name] = {}
    # Add a new instance of each of the neurons to the C++ NetworkStructures object.
    for i in range(num_neurons):
        # Add a new neuron.
        self.networkstructures.neurons.append(
                        getattr(self.networkFactory.neuron)(**neuron_params))
        # Create a new connection list object for this neuron.
        self.networkstructures.add_connection_list()
        # Append an empty list to the Python temp_connections object.
        self.temp_connections.append([])
```

FIG. 4D

```
def add_subpopulation(self, pop_name=None, name=None, start_neuron=None, stop_neuron=None):
    # Perform error checking on the input parameters.
    self.populations[name] = Population(self.populations[pop_name].start_idx+start_neuron,
        self.populations[pop_name].start_idx+stop_neuron,
        True, pop_name)

self.populationComms[name] = {}
```

FIG. 4E

```
def connect_full(self, src=None, dest=None, num_connections=None,
                 synapse=None, syn_params=None, generator=None, gen_params=None)
```

FIG. 4F

```python
def make_connection(self, src_neuron, dest_neuron, weight_gen, synapse, syn_params):
    retval = False
    # Check if the synaptic connection is already in the temp connection structure
    if (not dest_neuron in self.temp_connections(src_neuron)) and (src_neuron!=dest_neuron):
        # Add this new connection to the temp connections list
        self.temp_connections(src_neuron)(dest_neuron) = 1
        # Use the weight generator to get the new synapse's weight
        syn_params('weight') = weight_gen.get_weight()
        # Create the actual synapse using the factory
        syn = getattr(self._synapseFactory, synapse)(**syn_params)
        # Add a reference to the new synapse to the C++ synapse structure
        self.networkstructures.synapses.append(syn)
        # Add a reference to the same synapse to the destination neuron's
        # pre synaptic connection list.
        self.networkstructures.neurons(dest_neuron).add_synapse(syn)
        # Add the new connection to the C++ connection structure.
        self.networkstructures.add_connection(src_neuron,syn)
        # Set the return value to success
        retval = True
    return retval
```

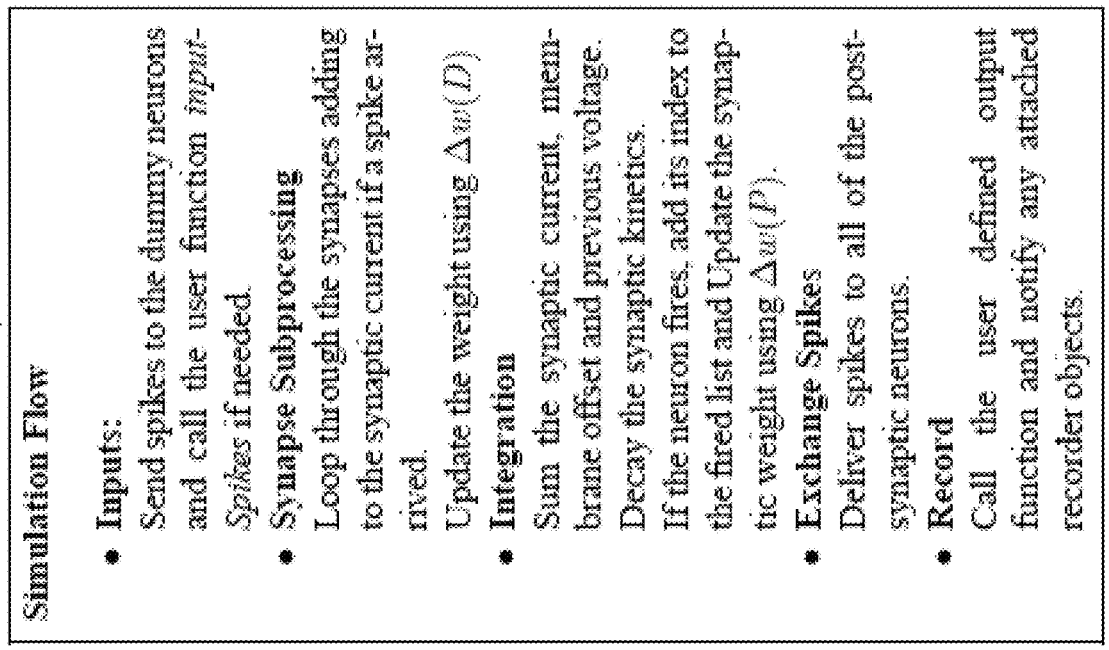
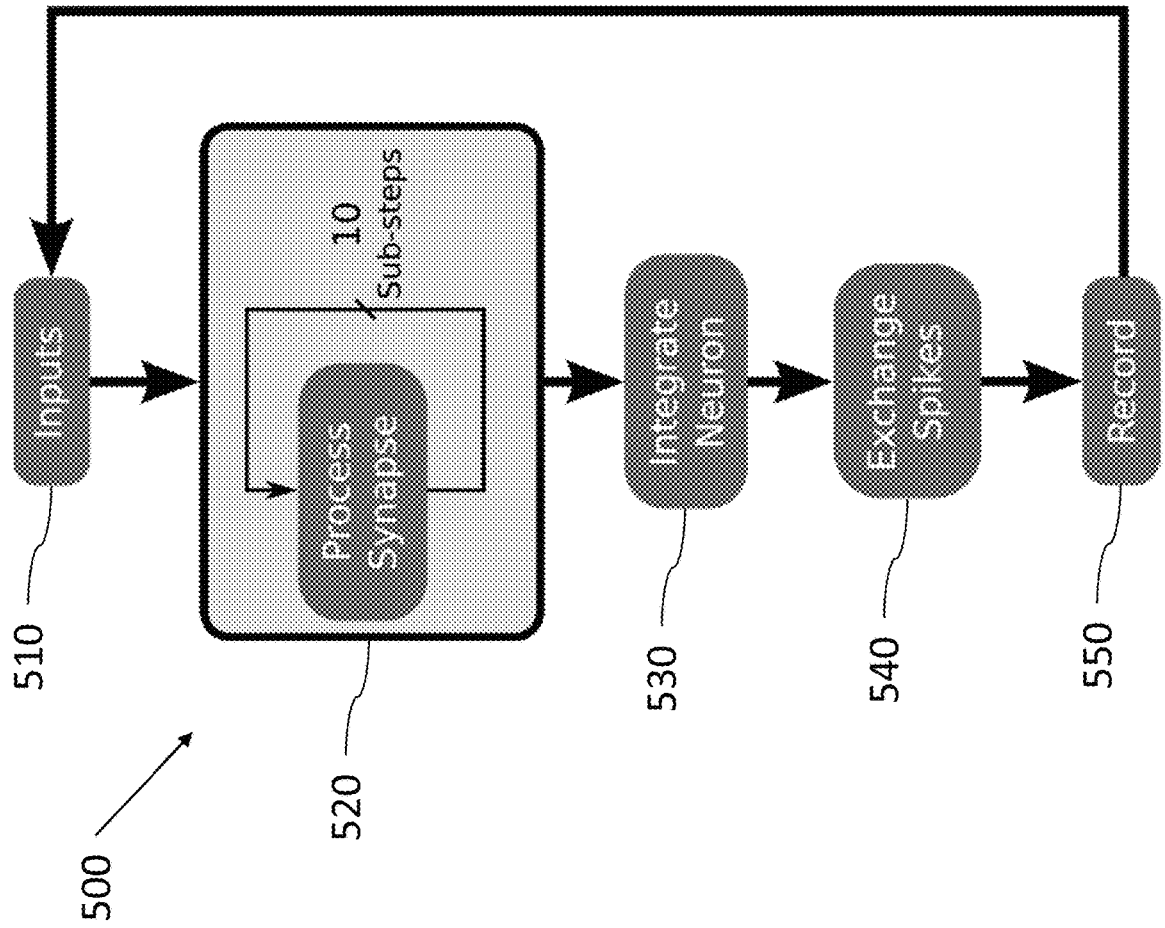
FIG. 5

FIG. 5A

```
def _process_inputs(self):
    # If we've run out of input spikes call the user function.
    if self.inputs.is_empty():
        self.input_function.function_name(**self.input_function.params)
    # Deliver all of the input spikes for this iteration to the input neurons
    for index in self.inputs.get_next():
        self.network.networkstructures.neurons(index).force_spike()
```

FIG. 5B

```
def input_function(inputs=None):
    inputs.set_span(1000)
    inputs.add_exponential(pop_name='mix', rate=100, start_time=0, duration=1000)
```

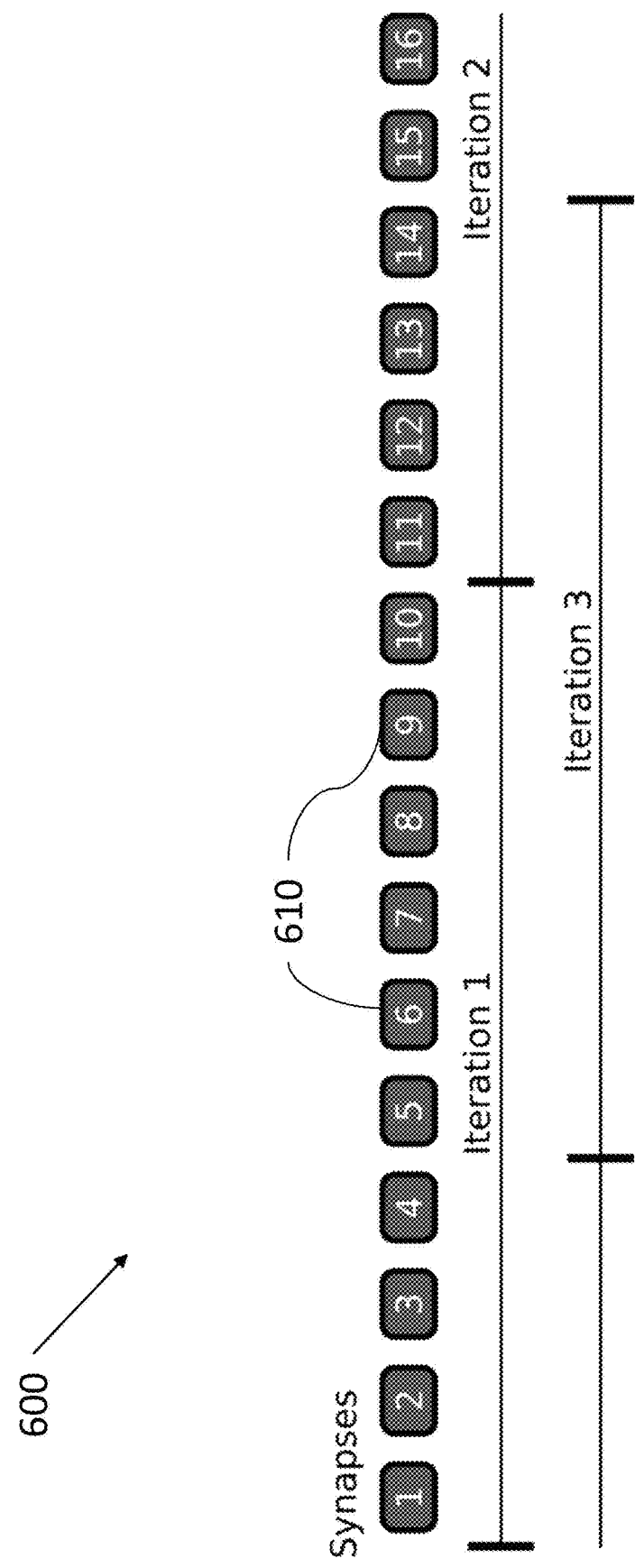

FIG. 6A

```
for sub_tick in range(10):
    synapse = get_next_synapse_subprocessing()
    if synapse.spiked():
        x = current_time - synapse.last_spike_time - 1
        y = (sub_tick + 1) + (x*10)
        if y < 16:
            synapse.spike_arrival_time = current_time + sub_tick/10
            process_spike(synapse)
            synapse.reset_spike()
```

FIG. 6B

```
add_spike_current(synapse.weight())
synapse.pre_synaptic_update(neuron.last_spike_time)
```

FIG. 6C

```
# This is assuming that the last spike time is the current time
delta_t = synapse.last_spike_time - neuron_spike_time
index = int(delta_t / CM)
delta_w = stdp_look_up(index)
self.weight = self.weight - delta_w
```

FIG. 6D

```
# Process any remaining synapses from a previous firing
if self.synapses_remaining:
    potentiate_synapses(current_time)
else:
    # increment the circular synapse buffer if needed
    increment_next_synapse_integration()

# Integrate the voltage
voltage = voltage + i_syn + i_offset

# Decay the synaptic current
i_syn = int(i_syn*kd)
i_syn = int(i_syn+1)

if voltage > threshold:
    self.process_spike()
```

FIG. 6E

```
for sub_tick in range(start,stop):
    synapse = get_next_synapse_integration()
    process_time = current_time + sub_tick/10
    synapse.post_synaptic_update(process_time)
```

FIG. 6F

```
delta_t = process_time - synapse.last_spike_time
index = int(delta_t / dt)
delta_w = stdp_look_up(index)
self.weight = self.weight + delta_w
```

FIG. 6G

```
if self.spike:
    fire_list.add(self.id)
```

FIG. 6H

```
current_firings.fill(0)
for index in network.networkStructures.fire_list:
    current_firings[index] = 1
    firing_stats[index] += 1
    # Call send_spike.
    network.networkStructures.send_spike(index, self.current_time)
# clear the fire_list
network.networkStructures.reset_fire_list()
```

FIG. 6J

```
def output_function(stats=None, firing_stats=None)
```

FIG. 6K add_output_population(population_index, population, (female

```
def experiment_input(inputs):
    # set the input time span in ms.
    inputs.set_span(100)

# Add individual spikes.
    for t in range(100):
        for cell_idx in inputs.cell_range("in"):
            inputs.add_spike("in",cell_idx,t)

# Add Poisson spikes to a population
    inputs.add_poisson_spikes("in", rate=10, start_time=10, duration=50)

def experiment_output(stats, firing_stats):
    for population_stats in stats:
        print "Population %s had %i action potentials."
            % (population_stats.name,population_stats.firings)
```

METHOD AND APPARATUS FOR EMULATION OF NEUROMORPHIC HARDWARE INCLUDING NEURONS AND SYNAPSES CONNECTING THE NEURONS

CROSS-REFERENCE TO RELATED APPLICATION

This application claims priority to and the benefit of U.S. Provisional Appl. No. 62/155,420, filed Apr. 30, 2015, the entire content of which is incorporated herein by reference.

STATEMENT REGARDING FEDERALLY SPONSORED RESEARCH OR DEVELOPMENT

The present invention was made with government support under Contract No. HR0011-09-C-0001 awarded by the Department of Defense. The government has certain rights to the present invention.

BACKGROUND

1. Field

Aspects of embodiments of the present invention relate to a method and apparatus for emulation of neuromorphic hardware.

2. Description of Related Art

Neuromorphic hardware refers to computing hardware that makes use of very-large-scale integration (VLSI) systems containing electronic analog circuits to mimic neurobiological architectures present in the nervous system. One goal of neuromorphic hardware is to build a cognitive computer with similar form, function, and architecture to the mammalian brain.

SUMMARY

Aspects of embodiments of the present invention are directed to a method and apparatus for emulation of neuromorphic hardware. Further aspects are directed to an apparatus capable of digitally emulating neuromorphic hardware, such as the Systems of Neuromorphic Adaptive Plastic Scalable Electronics (SyNAPSE) neuromorphic hardware. For example, the apparatus may be any hardware system capable of executing machine code (e.g., a personal computer (PC), field-programmable gate array (FPGA), or computing cluster). By emulating neuromorphic hardware, the apparatus may process and produce neural spiking information identical to that produced in neuromorphic hardware, such as the neuromorphic hardware developed as part of the Defense Advanced Research Projects Agency (DARPA) SyNAPSE program. Aspects of embodiments of the present invention may provide a way of circumventing the need for or replacing the neuromorphic hardware in a deployed system.

According to an embodiment of the present invention, a method for emulation of neuromorphic hardware on a computer processor is provided. The neuromorphic hardware includes computing circuits. The computing circuits include neurons and synapses connecting the neurons. The neurons are configured to communicate to each other through the synapses via spikes. The computing circuits are configured to execute in parallel in increments of time. The method includes for each said time increment, emulating processing of the synapses, emulating processing of the neurons, and recording by the processor the next ones of the spikes for a subset of the neurons on a non-transitory physical medium. The processing of the synapses includes receiving previous ones of the spikes at presynaptic ends of the synapses, and transmitting the received previous ones of the spikes to postsynaptic ends of the synapses. The processing of the neurons includes receiving current ones of the spikes from the postsynaptic ends of the synapses, generating next ones of the spikes based on the received current ones of the spikes, and transmitting the next ones of the spikes to the presynaptic ends of the synapses.

The method may further include, for each said time increment, calling by the processor a user defined output function.

The synapses may include weights. The receiving of the current ones of the spikes may further include receiving the weights of corresponding ones of the synapses. The generating of the next ones of the spikes may be further based on the received weights. The processing of the synapses may further include reweighting the synapses based on the previous and the next ones of the spikes. The method may further comprises, for each said time increment, recording by the processor the weights of the synapses for a subset of the synapses on the non-transitory physical medium.

The reweighting of the synapses may include inhibiting the weights of the synapses that receive the previous ones of the spikes and whose said neurons generated the next ones of the spikes for the previous said time increment, and potentiating the weights of the synapses whose said weights contribute to the generating of the next ones of the spikes.

The generating of the next ones of the spikes may include summing the received weights.

The generating of the next ones of the spikes further comprises adding, to the summed received weights, a previous said summed received weights multiplied by a decay factor.

The decay factor may be fixed.

According to another embodiment of the present invention, a system for emulation of neuromorphic hardware is provided. The neuromorphic hardware includes computing circuits. The computing circuits include neurons and synapses connecting the neurons. The neurons are configured to communicate to each other through the synapses via spikes. The computing circuits are configured to execute in parallel in increments of time. The system includes a processor and a non-transitory physical medium. The medium has instructions stored thereon that, when executed by the processor, causes the processor to, for each said time increment, emulate processing of the synapses, emulate processing of the neurons, and record the next ones of the spikes for a subset of the neurons on the non-transitory physical medium. The processing of the synapses may include receiving previous ones of the spikes at presynaptic ends of the synapses, and transmitting the received previous ones of the spikes to postsynaptic ends of the synapses. The processing of the neurons may include receiving current ones of the spikes from the postsynaptic ends of the synapses, generating next ones of the spikes based on the received current ones of the spikes, and transmitting the next ones of the spikes to the presynaptic ends of the synapses.

The instructions, when executed by the processor, may further cause the processor to, for each said time increment, call a user defined output function.

The synapses may include weights. The receiving of the current ones of the spikes may further include receiving the weights of corresponding ones of the synapses. The generating of the next ones of the spikes may be further based on the received weights. The processing of the synapses may further include reweighting the synapses based on the previous and the next ones of the spikes. The instructions, when executed by the processor, may further cause the processor to, for each said time increment, record the weights of the synapses for a subset of the synapses on the non-transitory physical medium.

The reweighting of the synapses may include inhibiting the weights of the synapses that receive the previous ones of the spikes and whose said neurons generated the next ones of the spikes for the previous said time increment, and potentiating the weights of the synapses whose said weights contribute to the generating of the next ones of the spikes.

The generating of the next ones of the spikes may include summing the received weights.

The generating of the next ones of the spikes may further include adding, to the summed received weights, a previous said summed received weights multiplied by a decay factor.

The decay factor may be fixed.

The above and other embodiments of the present invention provide for a method and apparatus to replace neuromorphic hardware with any system capable of running machine code. This helps reduce the complexity of deploying neuromorphic systems while still maintaining the capabilities of using neuromorphic hardware later in the system life cycle. In addition, this may be used to replace or extend the neuromorphic hardware in an existing system, including automotive and aerospace (e.g., intelligence, surveillance, and reconnaissance (ISR)) and autonomous systems applications without the need for actual hardware while ensuring accuracy of performance when actually deployed in the neural hardware at a later stage. Further embodiments provide for a useful product for testing and development of neuromorphic systems before working with neuromorphic hardware directly. Still further embodiments complement many of the existing neural network simulation environments by providing a direct path from software to embedded applications that use neuromorphic hardware.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate example embodiments of the present invention. These drawings, together with the description, serve to better explain aspects and principles of the present invention.

FIGS. 4A-4F illustrate various example code portions for implementing a neuromorphic hardware simulator according to an embodiment of the present invention.

FIG. 5 is a flow diagram of an example single iteration flow and corresponding example steps of a simulator according to an embodiment of the present invention.

FIGS. 5A-5B illustrate various example code portions for implementing input loops and functions for a neuromorphic hardware simulator according to an embodiment of the present invention.

FIG. 6 is a schematic diagram illustrating an example synaptic processing according to an embodiment of the present invention.

FIGS. 6A-6H and 6J-6M illustrate various example code portions for implementing synapse subprocessing, neuron integration, spike exchange, and recording steps for a neuromorphic hardware simulator according to an embodiment of the present invention.

DETAILED DESCRIPTION

Figure 1:
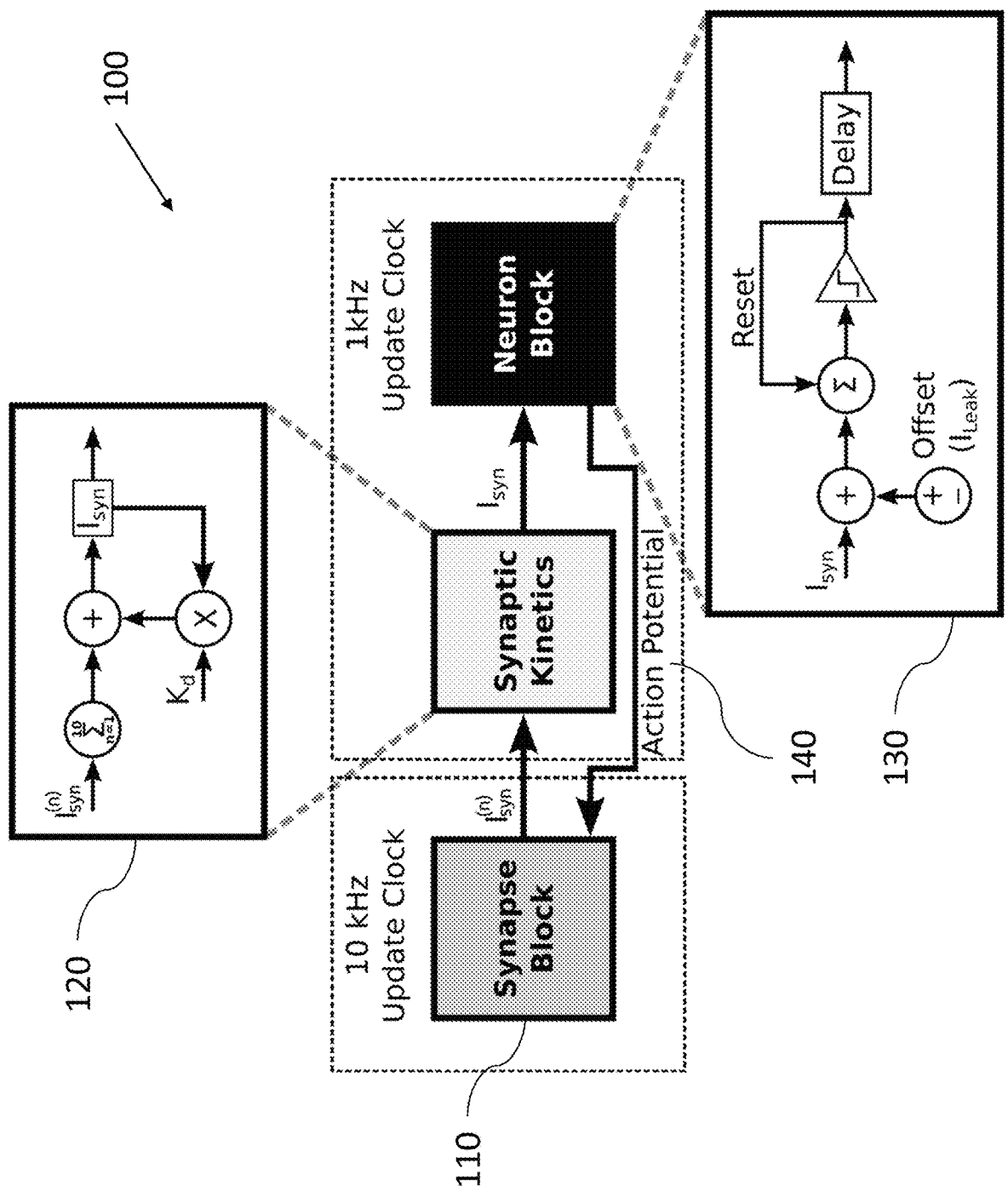
FIG. 1 is a schematic diagram of an example neuromorphic hardware node emulated according to an embodiment of the present invention.

The following description is provided to enable one of ordinary skill in the art to make and use embodiments of the present invention and to incorporate such embodiments in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the aspects, principles, and novel features disclosed herein.

In the detailed description that follows, numerous specific details are set forth in order to provide a more thorough understanding of some of the embodiments of the present invention. However, it will be apparent to one skilled in the art that the present invention may be practiced without necessarily being limited to these specific details. In other instances, well-known structures and devices may be shown in block diagram form, rather than in detail, in order to avoid obscuring aspects of the present invention.

The reader's attention is directed to all papers and documents that are filed concurrently with this specification and that are open to public inspection with this specification, and the contents of all such papers and documents are incorporated herein by reference. All the features disclosed in this specification (including any accompanying claims, abstract, and drawings) may be replaced by comparable features serving the same, equivalent, or similar purpose, unless expressly stated otherwise. Thus, unless expressly stated otherwise, each feature disclosed is only one example of a generic series of equivalent or similar features. Similarly, unless indicated to the contrary, features of one embodiment may be incorporated into other embodiments without departing from the spirit and scope of the present invention.

Furthermore, any element in a claim that does not explicitly state "means for" performing a specified function, or "step for" performing a specific function, is not to be interpreted as a "means" or "step" clause as specified in 35 U.S.C. § 112(f). In particular, the use of "step of" or "act of" in the claims herein is not intended to invoke the provisions of 35 U.S.C. § 112(f).

Example embodiments of the present invention will now be described with reference to the accompanying drawings. In the drawings, the same or similar reference numerals refer to the same or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

With evolving neuromorphic hardware, such as the SyNAPSE hardware, there may be a number of implementation details that separate the neuromorphic hardware from traditional software simulation environments, thus creating barriers to traditional forms of testing the neuromorphic hardware. One technique for overcoming these testing barriers is to use software emulation of the neuromorphic hardware rather than the neuromorphic hardware itself. Employing a software environment may also provide a finer level of control and facilitate rapid porting of the models developed in earlier phases of neuromorphic hardware development. With this in mind, the present drawings illustrate example aspects of neuromorphic hardware emulation embodiments of the present invention.

FIG. 1 is a schematic diagram of an example neuromorphic hardware node 100 emulated according to an embodiment of the present invention.

Referring to FIG. 1, in an implementation of the SyNAPSE neuromorphic hardware, the synapses 110, synaptic kinetics 120, and neurons 130 may be grouped together in nodes 100. The neuromorphic hardware may group each neuron 130, its incoming synapses 110, and the synaptic kinetics 120 into nodes 100. FIG. 1 illustrates an example of this connectivity within a node 100 and the basic functions of the neuron 130 and synaptic kinetics 120 blocks. In one or more embodiments, simulating the nodes 100 may be carried out by simulating the synapses 110, simulating the synaptic kinetics (or neurotransmitter kinetics) 120, and simulating the neurons 130. Example such simulations are described in further detail below.

In one embodiment, there may be a maximum of 16 presynaptic connections allowed by the neuromorphic hardware. This, coupled with the low synaptic weights, may create some difficulty when comparing neural models developed in other simulators to those intended for the neuromorphic hardware. In addition, the neuron block 130 may be on a 1 kHz clock, corresponding to a 1 ms integration step, while the synapses 110 may be on a 10 kHz clock (i.e., 10 times faster).

Because of this, only 10 synapses 110 may be read during an integration step, producing 10 separate synaptic currents $I_{syn}^{(1)}, I_{syn}^{(2)}, \ldots, I_{syn}^{(10)}$ These may be summed together in the synaptic kinetics block 120 (on a 1 kHz clock, like the neuron block 130) and added to the previous synaptic current $I_{syn}$ after it has been multiplied by a decay constant $K_d$. During the following integration step the next 10 synapses 110 may be read in. This may create a slight inconsistency in the arrival time of spikes 140. In addition to this, incoming spikes that are not processed within 1.5 ms may be dropped by the synapse block 110. This is elaborated in further detail below.

The synapse blocks 110 may support, for example, three types of synapses: (1) fixed, either excitatory or inhibitory; (2) plastic using excitatory Spike-Timing Dependent Plasticity (STDP); or (3) plastic using symmetric inhibitory STDP. In all cases the set of possible synaptic weights W may be expressed as $W = \{x \in \Box | 0 \leq x \leq 7\}$. For the fixed synapses, the weights may be selected from W and remain fixed. For the plastic synapses, the initial weights may be drawn from W, but the weights may change over time (to other values in W) based on factors such as the learning rules described below.

For excitatory STDP synapses, the weight changes may be based, for example, on a form of STDP described by Song, S., K. D. Miller, and L. F. Abbott (2000), "Competitive hebbian learning through spike-timing-dependent synaptic plasticity," Nature Neuroscience (9), pp. 919-926, the entire content of which is herein incorporated by reference. This is a Hebbian learning rule where the arrival of presynaptic action potentials (APs) is compared to the activity of the postsynaptic neuron. If the presynaptic spike arrives before the postsynaptic neuron fires, the connection is potentiated; the presynaptic neuron is contributing positively to the postsynaptic neuron's firing. If the presynaptic spike arrives after the postsynaptic neuron fires the synapse is depressed; the presynaptic neuron is not contributing.

The rule implemented in the neuromorphic hardware may be based on the assignment $$g_{eff} \leftarrow g_{eff} + \Delta w, \quad (1)$$

where $g_{eff}$ is the synaptic weight, $\Delta t = t_{pre} - t_{post}$ is the change in time (expressed as a negative number), $\Delta w$ is the change in synaptic weight and is subject to exponential decay with initial quantity A (e.g., 7) and mean lifetime r (e.g., 8 ms), and can be expressed as $$\text{either } \Delta w = A_+ e^{\left(\frac{\Delta t}{\tau_+}\right)} \text{ (potentiating) or } \Delta w = A_- e^{\left(\frac{\Delta t}{\tau_-}\right)} \text{ (depressive),} \quad (2)$$

subject to if $g_{eff} < 0$, then $g_{eff} \leftarrow 0$, and if $g_{eff} < g_{effmax}$, then $g_{eff} \leftarrow g_{effmax}$ (here, $g_{effmax}$ is the maximum synaptic weight, e.g., 7). In addition, the mean lifetimes $\tau_+$ and $\tau_-$ are defined further in Equation 3 below, while the initial values $A_-$ and $A_+$ are also discussed below.

Figure 2:
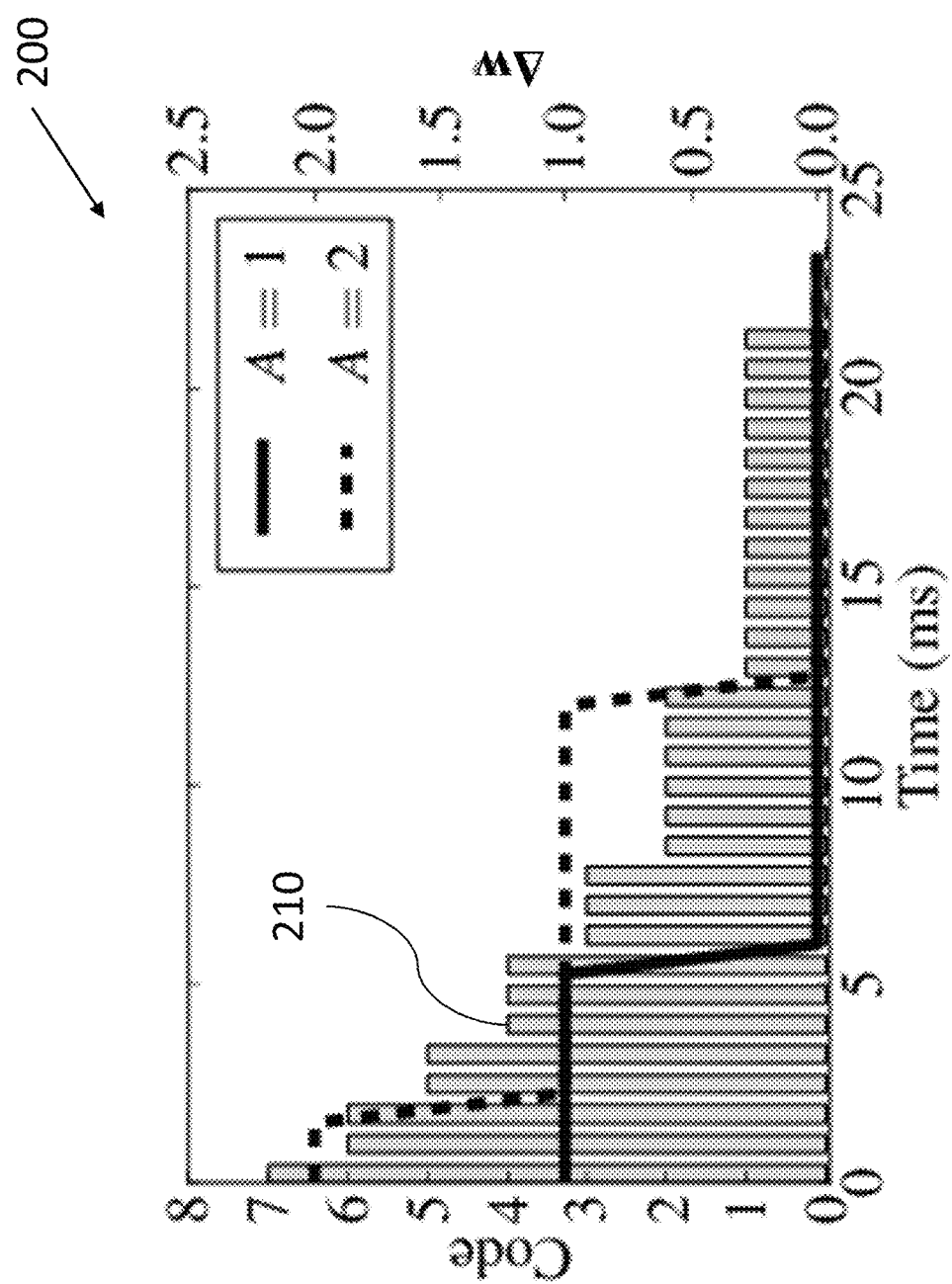
FIG. 2 is a graph illustrating an example of the decay of the spike-timing dependent plasticity (STDP) variables and corresponding values of $\Delta w$ for $\tau=8$ ms for different initial values A according to an embodiment of the present invention.

FIG. 2 is a graph 200 illustrating an example of the decay of the STDP variables and corresponding values of $\Delta w$ for $\tau = 8$ ms for different initial values A according to an embodiment of the present invention.

In the neuromorphic hardware, the depressive and potentiating effects may be tracked separately. The variable D may be used to keep track of the depressive ('−') effects and P may be used to keep track of the potentiating ('+') effects. When the postsynaptic neuron fires an AP (e.g., a depressive action, or '−'), then D←7 (i.e., the maximum code value, such as 7). Similarly, when a presynaptic neuron fires (e.g., a potentiating action, or '+'), then P←7 (i.e., the maximum code value, such as 7). These variables are then updated at each time step to approximate the exponential decay of Equation 2 (e.g., rounded to the nearest integer value obtained from Equation 2).

For example, the neuromorphic hardware may implement this decay over 32 set or predefined steps 210, as illustrated in FIG. 2. The steps 210 are shown as bars in the graph 200, with initial code value 7 (on the left, step 1), and decrementing through code values 6 (steps 2-3), 5 (steps 4-5), 4 (steps 6-8), 3 (steps 9-11), 2 (steps 12-17), 1 (steps 18-29), and 0 (steps 30-32). These code values are also derivable from equation (2) using initial value A=7, individual time steps of 0.75 ms, and a mean lifetime τ=8 ms, together with corresponding rounding to the nearest code value (or integer).

Although these steps 210 are fixed in the graph 200 (i.e., 0.75 ms per step 210), the clock width CW of the steps 210 may be configurable. This may be defined as $$CW = \frac{3\tau}{32}$$

for 32 such time steps, where $\tau \in \{\tau_-, \tau_+\}$ is the time constant (mean lifetime) for the D ('−') and P ('+') variables in seconds. It should be noted that after 32 such time steps, the exponential decay results in less than 5% of the initial value remaining, which may be discounted for the set of weights W defined above.

In the neuromorphic hardware, the mean lifetime may be computed, for example, by using clock divider variables $DIV_x$, where x∈{pre,post}, and the corresponding equations $$\tau_+ = \frac{(DIV_{pre} + 1) \times 32}{3 \times 10^6} \text{ and } \tau_- = \frac{(DIV_{post} + 1) \times 32}{3 \times 10^6} \quad (3)$$

The clock divider may be, for example, an integer value in a range, such as an integer between 1 and 1023, which limits each of the mean lifetime time constants r to the range from 21.3 μs to 10.92 ms. Because CW=3τ/32, the total decay time for the STDP variables over 32 time steps 210 is equal to 3τ.

The STDP variables may be used to compute how far a synapse will change after an AP. The magnitude of that change may be determined by the value of the depressing or potentiating (STDP) variables D or P at that time and, for example, a lookup table that may be dependent on the value of the initial value $A_-$ or $A_+$. An example such table is presented in Table 1 and is presented graphically in FIG. 2. It should be noted that the magnitude of A may be positive or negative. Two possible values of A are presented in Table 1, namely A=1 and A=2. The corresponding values of Δw are calculated based on the STDP variables versus using Equation 2 directly. For example, for each time step, the corresponding STDP variable (code value) is multiplied by A, the product divided by 7 (the maximum code value), and the result rounded to the nearest integer (or code value) to produce Δw.

TABLE 1

STDP Look-up

| Step Number | STDP | Δw, A = 1 | Δw, A = 2 |
|---|---|---|---|
| 1 | 7 | 1 | 2 |
| 2 | 6 | 1 | 2 |
| 3 | 6 | 1 | 2 |
| 4 | 5 | 1 | 1 |
| 5 | 5 | 1 | 1 |
| 6 | 4 | 1 | 1 |
| 7 | 4 | 1 | 1 |
| 8 | 4 | 1 | 1 |
| 9 | 3 | 0 | 1 |
| 10 | 3 | 0 | 1 |
| 11 | 3 | 0 | 1 |
| 12 | 2 | 0 | 1 |
| 13 | 2 | 0 | 1 |
| 14 | 2 | 0 | 1 |
| 15 | 2 | 0 | 1 |
| 16 | 2 | 0 | 1 |
| 17 | 2 | 0 | 1 |
| 18 | 1 | 0 | 0 |
| 19 | 1 | 0 | 0 |
| 20 | 1 | 0 | 0 |
| 21 | 1 | 0 | 0 |
| 22 | 1 | 0 | 0 |
| 23 | 1 | 0 | 0 |
| 24 | 1 | 0 | 0 |
| 25 | 1 | 0 | 0 |
| 26 | 1 | 0 | 0 |
| 27 | 1 | 0 | 0 |
| 28 | 1 | 0 | 0 |
| 29 | 1 | 0 | 0 |
| 30 | 0 | 0 | 0 |
| 31 | 0 | 0 | 0 |
| 32 | 0 | 0 | 0 |

When the postsynaptic neuron fires, the synaptic weight for each of the presynaptic neurons is updated using Δw(P) in Equation 1. Similarly if the presynaptic neuron fires, the weight for each of the postsynaptic synapses is updated by Δw(D) in Equation 1.

Figure 3:
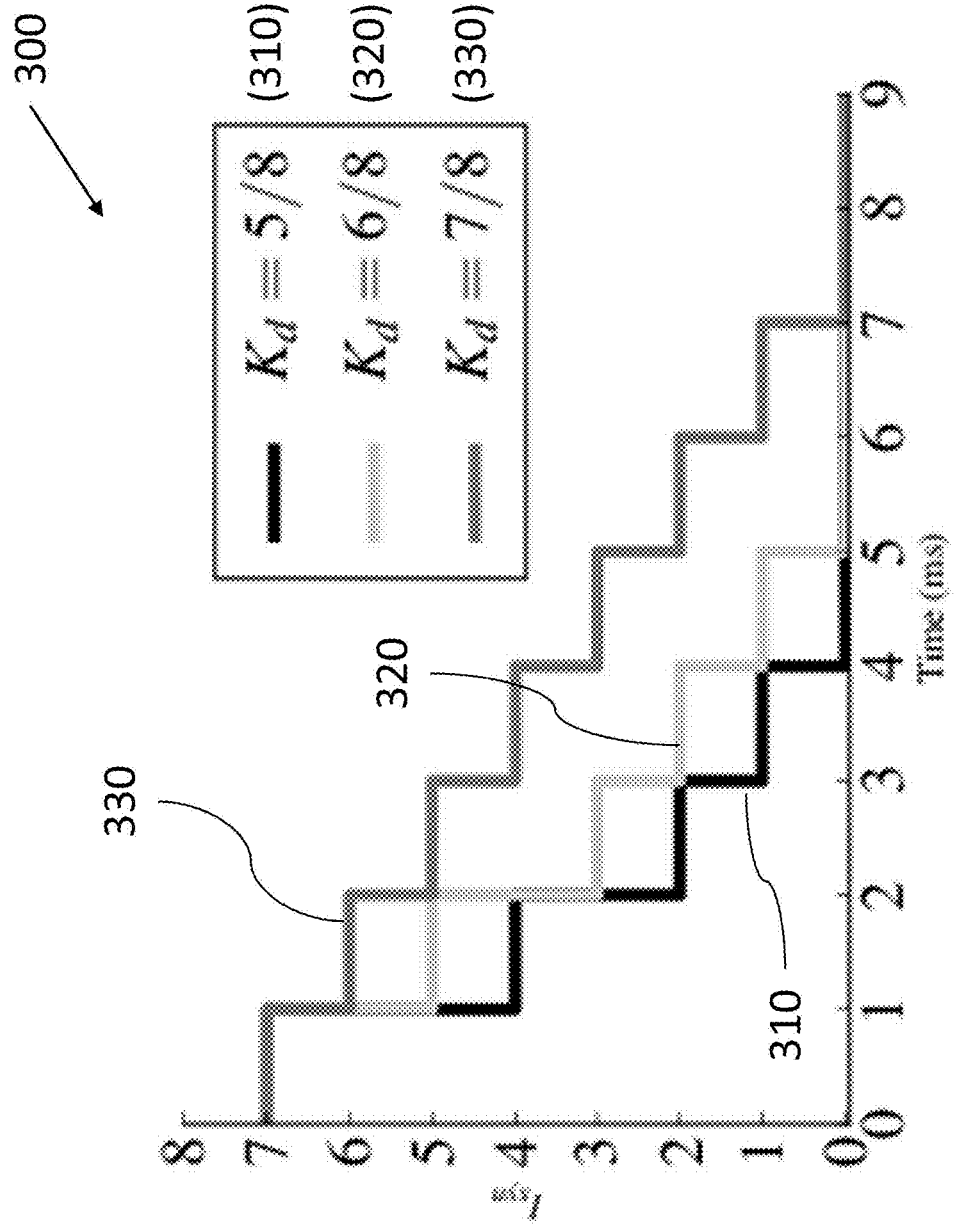
FIG. 3 is a graph illustrating example options for approximating the neurotransmitter kinetics according to an embodiment of the present invention.

FIG. 3 is a graph 300 illustrating example options for approximating the neurotransmitter kinetics 120 according to an embodiment of the present invention.

There may be an immediate buffering of the neurotransmitter that occurs after release. In addition, re-uptake mechanisms on the presynaptic cell may recycle it. In large-scale modeling this may either be ignored and the neurotransmitter release is treated as a step change in postsynaptic membrane current, or the buffering and re-uptake may be modeled by a decay function.

Rather than modeling the concentration of the neurotransmitter species, instead its influence on the conductance of the ion channels in the postsynaptic cell may be simulated. This may take the form $$\tau \frac{dg}{dt} = -g + \sum W_j \delta(t - t_j),$$

where g is the conductance, τ is the time constant that describes the time course of the decay in synaptic conductance, $W_j$ is the initial change in conductance when a spike occurs, and the (Dirac) delta function, $\delta(t-t_j)$, imparts that influence for a spike at time $t_j$.

In the neuromorphic hardware, this decay may be done at the single neuron level for all synapse types. Because of the clock speeds only 10 synapses may be read during an integration step. These 10 synapses may be summed together and added to the previous synaptic current after it has been multiplied by a decay constant. An equation for this may be $$I_{syn}(t) = \sum_{n=1}^{10} I_{syn}^n(t) + K_d I_{syn}(t-1), \quad (4)$$

where $I_{syn}$ is the total synaptic current, n is the index into a circular buffer of synapses, $K_d$ is the decay constant, and $I_{syn}^n$ is one of the individual synaptic currents (one for each synapse). There may be three values for the decay, $K_d=\{5/8, 6/8, 7/8\}$. These may approximately relate to $\tau=\{2,4,8\}$ ms (e.g., the values of $K_d^4$ for these value of $K_d$ are approximately in the ratio 2:4:8). The traces for these are illustrated in FIG. 3.

In FIG. 3, the x-axis represents time (ms), the y-axis represents the total synaptic current $I_{syn}$ that takes on integer values between 0 and 7, and the three traces 310, 320, and 330 represent the currents for the different decay constants $K_d=5/8, 6/8,$ and $7/8$, respectively. All three traces have an initial value of 7 at time=0 ms, with the current value for trace 330 (decay constant $7/8$) dropping 1 each millisecond, trace 320 (decay constant $6/8$) dropping 2 for each of the first two milliseconds, and then 1 for each millisecond after, and trace 310 dropping 3 for the first millisecond, 2 for the second millisecond, and then 1 for each millisecond after. The currents are also derivable (from the previous value to the next value) by multiplying the previous value by the decay constant $K_d$ and rounding down to the nearest integer value to get the next value.

According to one or more embodiments, neurons 130 may be modeled by the relationship:

$$C_m \frac{dV}{dt} = I_{syn} + I_{offset},$$

which for $C_m=1$ μF/cm² and an integration time constant of 1 ms the Euler approximation and digital implementation for the neuron may be found by $$V(t)=I_{syn}+I_{offset}+V(t-1).$$

Figure 4:
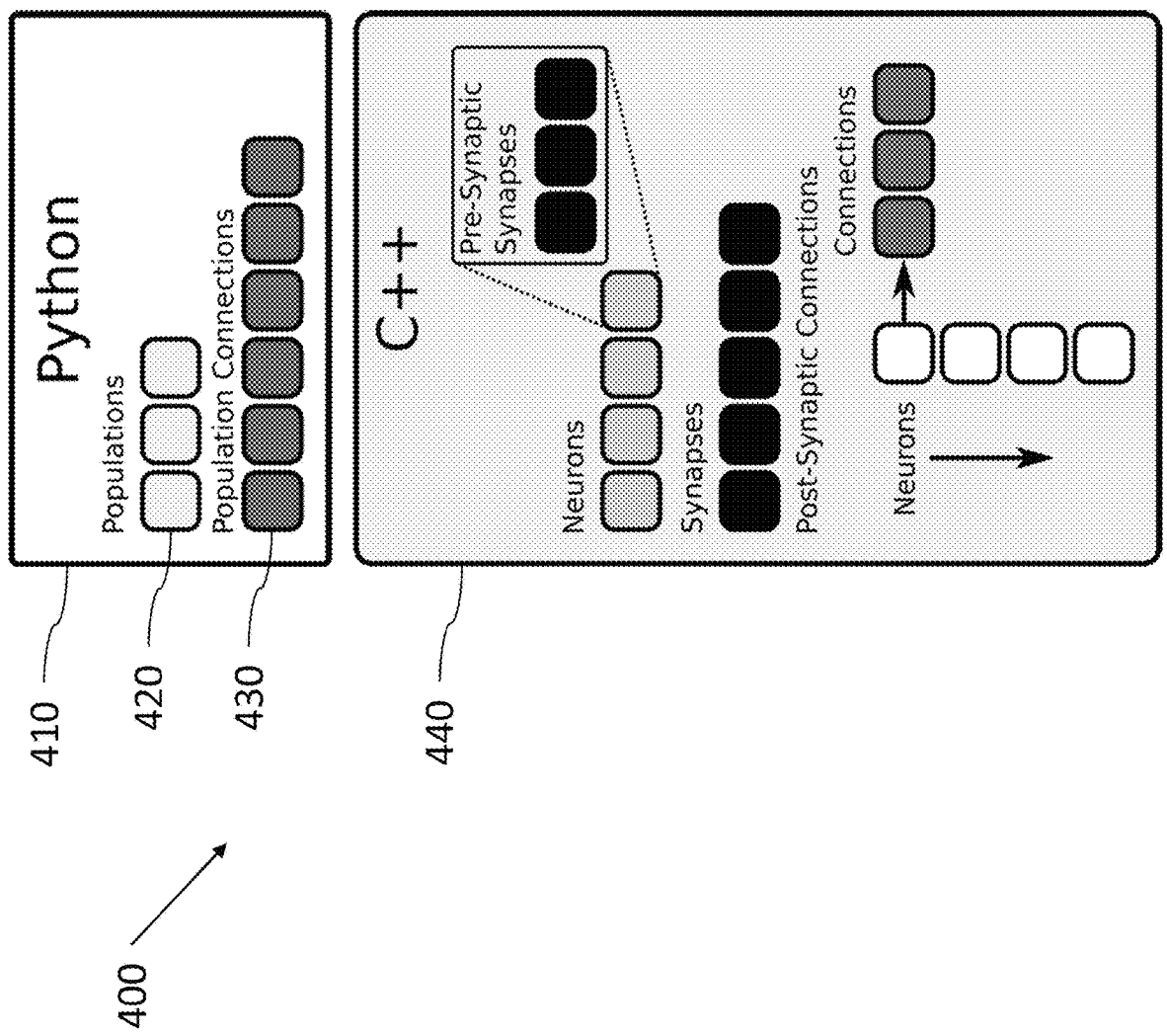
FIG. 4 is a schematic diagram of example persistent data structures according to an embodiment of the present invention.

FIG. 4 is a schematic diagram of example persistent data structures 400 according to an embodiment of the present invention. FIGS. 4A-4F illustrate various example code portions for implementing a neuromorphic hardware simulator according to an embodiment of the present invention.

Referring to FIG. 4, the network information 400 may be stored in both Python 410 and C++ objects 440. Python, for example, may be used in portions for ease of programming and simplicity of design while C++ may be used in other portions for specific functions or performance-related reasons. In an example embodiment, the population information 420 (for example, neuron populations) may be stored in Python and may be used for creating subpopulations as well as connections 430 between neurons in different populations. The population connections 430 may store the range of synapses that represent forward connections between populations 420. This may be useful for reporting on synaptic weights between populations 420 and for visualizing the network. The C++ data structures 440 may be STL (Standard Template Library) vectors and, for performance, may be used during the simulation.

In one embodiment, a software package for emulating neuromorphic hardware may be developed as a hybrid Python/C++ application. FIG. 4 illustrates how the data structures 400 may be split between the two languages 410 and 440. Most of the network construction logic may be programmed in Python and the instantiation of the core elements may be facilitated through the use of a factory pattern. With this users may specify different model components as strings and the underlying factory code may instantiate the correct object. This may create a level of extensibility that will be important as support for future neuromorphic hardware is added. This may be done using classes for Factory and Functor as would be apparent to one of ordinary skill. See, e.g., FIG. 4A for example programming code for Factory and Functor class implementation according to an embodiment.

A neuromorphic hardware emulator according to one or more embodiments may be run for a particular period of time and with a particular set of inputs. Such a run is referred to as an experiment, and may be simulated in, for example, an object oriented programming language by constructing a corresponding experiment object. By way of example, in one embodiment, there may be four factories in the experiment object:

(1) NeuronFactory: Instantiates different neuron types depending on the desired hardware.
(2) SynapseFactory: Supports the creation of both static and plastic synapses.
(3) WeightGen Factory: Synaptic weights may be created randomly or as constants. This may create the generator object that may be used for specifying the initial synaptic weights.
(4) RecorderFactory: Facilitates the instantiation of the different classes of report types supported by the neuromorphic hardware emulator.

In one embodiment, the neuron population information 420 may be stored in Python using named tuple objects. See, e.g., FIG. 4B for example programming code for implementing the neuron population 420 according to an embodiment.

In one embodiment, the populations may be added through the Network object that creates the neurons using the C++ library. See, e.g., FIG. 4C for example programming code for implementing this add population technique according to an embodiment. With this scheme the Neuron objects may be stored as shared pointers in the Neuron vector encapsulated by the C++ NetworkStructures object. However, there is no restriction that the Neuron implementation must be developed in C++. For example, in other embodiments, different programming languages (such as different object oriented programming languages) may be used to implement the neurons. For instance, in some embodiments, as long as the objects inherit from the base Neuron class, then the pointer returned by the NeuronFactory will be stored correctly.

Relying on inheritance in this way, however, may negatively affect performance when there are a large number of neurons—each call to a Neuron object must reference a lookup table to know which code to execute. However, this possible loss of performance may be outweighed by the extensibility that this pattern provides.

In some embodiments, populations may be further partitioned into smaller subpopulations that provide finer control over the connections and recordings attached to the network. For example, in one embodiment, subpopulations may be references to contiguous neurons within the main population. See, e.g., FIG. 4D for example programming code for creating subpopulations according to an embodiment.

It should be noted that the addition of a subpopulation may only affect the Python data structures. The C++ structures used for the actual simulation may not need to be modified.

In some embodiments, there may be two types of neurons implemented: real neurons and dummy neurons. The real neurons may actually perform an integration and model a neuron in one way or another. The dummy neurons, on the other hand, may be used as points of entry into the network and may be spiked manually by the user.

Synaptic connections may be established from population to population using functions such as the example programming code in FIG. 4E, which, according to one embodiment, connects all of the neurons in the source population, src, to all of the neurons in the destination population, dest. In one or more embodiments, as illustrated in the example programming code of FIG. 4F, the private function_make_connection establishes each of the individual synaptic connections.

FIG. 5 is a flow diagram of an example single iteration flow 500 and corresponding example steps 560 of a simulator according to an embodiment of the present invention. FIGS. 5A-5B illustrate various example code portions for implementing input loops and functions 510 for a neuromorphic hardware simulator according to an embodiment of the present invention.

According to one or more embodiments, as illustrated in the single iteration flow 500 of FIG. 5, and further outlined for an example implementation in simulation flow steps 560, after the network has been constructed, the simulation may loop through the five steps 510 to 550. Each iteration of the simulation may be surrounded by calls to two user-defined functions that define the input and output procedures for the network. For example, according to some embodiments, these functions may be written in either C++ or Python as long as they are callable objects and implement the defined interface. It should be noted that while C++ and Python are described as example programming languages, the present invention is not limited thereto, and in other embodiments, different programming languages may be used, as would be apparent to one of ordinary skill.

Referring to FIG. 5, and more particularly to step 510, users may define a custom fill spikes callback that provides a mechanism for interfacing with external programs. See, e.g., FIG. 5A for example programming code for an input loop implementation according to an embodiment. In addition, see, e.g., FIG. 5B for example programming code for a general form of a user defined input function according to an embodiment. In the simulation steps 560, if desired, spikes may be sent to dummy neurons by the user by, for example, a function call (e.g., to user function inputSpikes). Defining inputs is explored further in another example below.

Figure 6G:
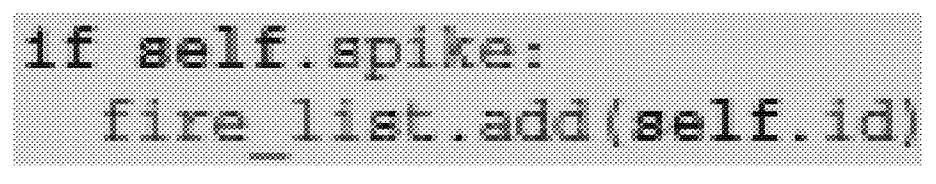

FIG. 6 is a schematic diagram illustrating an example synaptic processing 600 according to an embodiment of the present invention. FIGS. 6A-6M illustrate various example code portions for implementing synapse subprocessing, neuron integration, spike exchange, and recording steps for a neuromorphic hardware simulator according to an embodiment of the present invention.

Referring to FIG. 6, and also to FIG. 5 (and in particular, to step 520), the synaptic processing is illustrated as a series of, in this case, ten consecutive sub-steps going from left to right among the 16 synapses 610. Collectively, each such ten sub-steps forms an iteration. Three such iterations (1, 2, and 3) are illustrated in FIG. 6, cycling through the 16 synapses 610 and resuming the iteration from the beginning once the last of the synapses 610 is reached. For example, as outlined in the simulation flow 560, each such synapse 610 is processed, adding its corresponding synaptic current if a spike arrived for postsynaptic, or depressive, processing. For instance, the depressive weight may be updated by $\Delta w(D)$.

Referring back to FIG. 6, neuron integration periods 530 are outlined by the lines below the synapse list, corresponding to the iterations. Only the synapses 610 processed within these respective periods are included in the corresponding neuron integration step 530.

The synapse subprocessing 520 may be dependent on different factors, such as the different clock sources in the neuromorphic hardware (for example, as illustrated in FIG. 1), or the amount of time available for a receiving node to attend to a spike before the spike is dropped (for example, 1.5 ms). FIG. 6 illustrates how the synapses 610 are processed within a single neuron integration step 530. See, e.g., FIG. 6A for an example algorithm and corresponding programming code for processing the synapses 610 during synapse subprocessing 520 for a number of synapses 610 corresponding to a neuron integration step 530 according to an embodiment.

Referring to FIG. 6A, the first variable, x, may be used to determine, relative to the current time, when the cell fired. According to an embodiment, because the synaptic delay is 1 ms, the maximum time a spike will sit at the synapse is 2 ms. However, if the spike wait exceeds some set or predetermined time, such as 1.6 ms, the spike may be dropped in some embodiments.

Continuing with FIG. 6A, the second variable, y, may be used to determine when the cell fired relative to the sub tick (e.g., tenth of a ms). The last_spike_time may be the time that the presynaptic neuron fired based on the 1 kHz clock and the spike_arrival_time may be time the spike is attended to based on the 10 kHz clock. process_spike ( ) may handle the spike processing. See, e.g., FIG. 6B for an example process_spike ( ) function pseudo code. pre_synaptic_update ( ) may handle the processing for the spike-timing dependent plasticity (STDP) enabled synapses. See, e.g., FIG. 6C for example computer code for implementing the pre_synaptic_update ( ) routine. In the computer code of FIG. 6C, CW is the clock width and the look-up is computed using, for example, Table 1. The actual implementation may be done, for example, in C++ for performance.

According to an embodiment, the neuron integration block 530 may begin by checking if there are any synapses 620 that need to be updated from the previous iteration. The different currents may then be summed, as in Equation 4, and, if appropriate, spike events may be processed. See, e.g., FIG. 6D for example pseudo code for the neuron block integrations 530. Here, according to an embodiment, the function potentiate_synapses ( ) only updates the first ten synapses 610, which is a consequence of the 10 kHz clock (allowing only ten synapses to be processed in a one ms integration step 530). However, the remaining synapses 610 may be updated at the next (1 ms) time step.

See, e.g., FIG. 6E, for example computer code for processing each synapse 610 for the postsynaptic updating. According to the embodiment of FIG. 6E, post_synaptic_update ( ) may handle the postsynaptic processing for the STDP enabled synapses. See, e.g., FIG. 6F for example computer code for implementing the post_synaptic_update ( ) routine.

To better clarify the synapse increment as implemented in, for example, the computer code of FIG. 6F, there may be different clock speeds between the synapse processing and the neuron integration in the neuromorphic hardware. Accordingly, the "starting" synapse 610, or the synapse 610 attended to first during the current iteration may vary from one iteration to the next (e.g., for 16 synapses 610 and a ten-fold clock speed difference between the synapse clock and the neuron clock, the starting synapse 610 is a different synapse for five consecutive iterations). This is outlined in the synaptic sub-processing block of FIG. 6. The same phenomenon may happen when processing the presynaptic spike updates. To compensate for this, in some embodiments, a circular buffer may be updated after each integration.

However, with a circular buffer, when a neuron fires initially that buffer will already be incremented the appropriate number of steps. Since only 10 of the synapses 610 may be updated (e.g., the limit per integration block), in the next call to the integration block, the remaining synapses 610 should be updated, but this may leave the buffer in the wrong spot. To deal with this, in one or more embodiments, the circular buffer keeps track of where it is and when the buffer is called to increment, the buffer is moved the appropriate number of steps based on the 10 kHz clock. For the input neurons, in some embodiments, the integration may only check if a spike was added, as illustrated in the example computer code of FIG. 6G.

In summary, for one or more embodiments, as described in the simulation flow 560, during the neuron integration step 530, the synaptic currents may be summed, together with the membrane offset and the previous voltage. The synaptic kinetics may then decay (e.g., by a set or predetermined decay constant, such as decay constant $K_d$ described above in reference to Equation 4). If a neuron fires, its index may be added to the fired list and the synaptic weight updated using a potentiating weight $\Delta w(P)$.

Referring back to FIG. 5, in step 540, spikes may be delivered to all of the postsynaptic neurons. By way of example, in one embodiment, the spike exchange may loop through the fire_list (e.g., list of spikes waiting to fire) and records spike events for the current iteration as well as for the current output period. The output period may be the window of simulation time between calls to the user defined output function. This may provide the user a count of the total number of firings for each cell during this period. In addition, the spike events may be passed to the appropriate synapses through the NetworkStructure and the list may then be cleared. See, e.g., FIG. 6H for example computer code to implement such a spike exchange operation according to an embodiment.

Referring back to FIG. 5, in the record step 550, a user defined output function may be called and any attached recorder objects may be notified. For example, in one embodiment, the record call may handle different aspects of the simulation. A first such aspect may be calling the user defined output function. The frequency of the callback and the function pointer may be set by the user during the construction of the experiment. See, e.g., FIG. 6J for an example computer code definition of such a callback function according to an embodiment.

In the callback function of FIG. 6J, the two parameters that are passed in may provide different forms of the same information. For example, the information in the stats variable may be the total number of firings for populations of neurons that the user adds during the experiment. See, e.g., FIG. 6K for example computer code for including such populations by the user according to an embodiment.

These record step functions may make it relatively straightforward to gather the firing rate of a number of populations. Referring back to FIG. 6J, in one embodiment, the firing_stats variable may include each cell's total number of firings that occurred since the previous call to the user defined output function.

According to one embodiment, another aspect of the record process may be to loop through all of the recorder objects and call their respective write_array function. For example, there may be five different types of recorders. These may include:

(1) AverageWeightRecorder: Stores the average synaptic weight between populations.
(2) FileRecorder: Saves the spiking activity of a population to a binary file.
(3) VoltageRecorder: Saves the voltage of each of the neurons within a population to a binary file.
(4) WeightRecorder: Stores all of the synaptic weights between two populations.
(5) CustomRecorder: Stores spiking information directly into a custom object (such as an HRLAnalysis™ object, as described in Thibeault et al., Analyzing large-scale spiking neural data with HRLAnalysis™, *frontiers in Neuroinfomatics*, Mar. 5, 2014, the entire content of which is herein incorporated by reference).

In some embodiments, there may be several included visualization tools that may operate directly on the record objects. In addition to neural and synaptic information plotting there may also be tools for visualizing the network itself. For example, according to one embodiment, the networks may be plotted to the screen or saved to a file using Python NetworkX. The Graphviz dot format may also be written to a file.

In one embodiment, neuromorphic hardware simulations are wrapped within an Experiment object that exposes all of the functionality to the users. See, e.g., FIGS. 6L-6M for example computer code to create and run such an experiment according to an embodiment.

Figure 7:
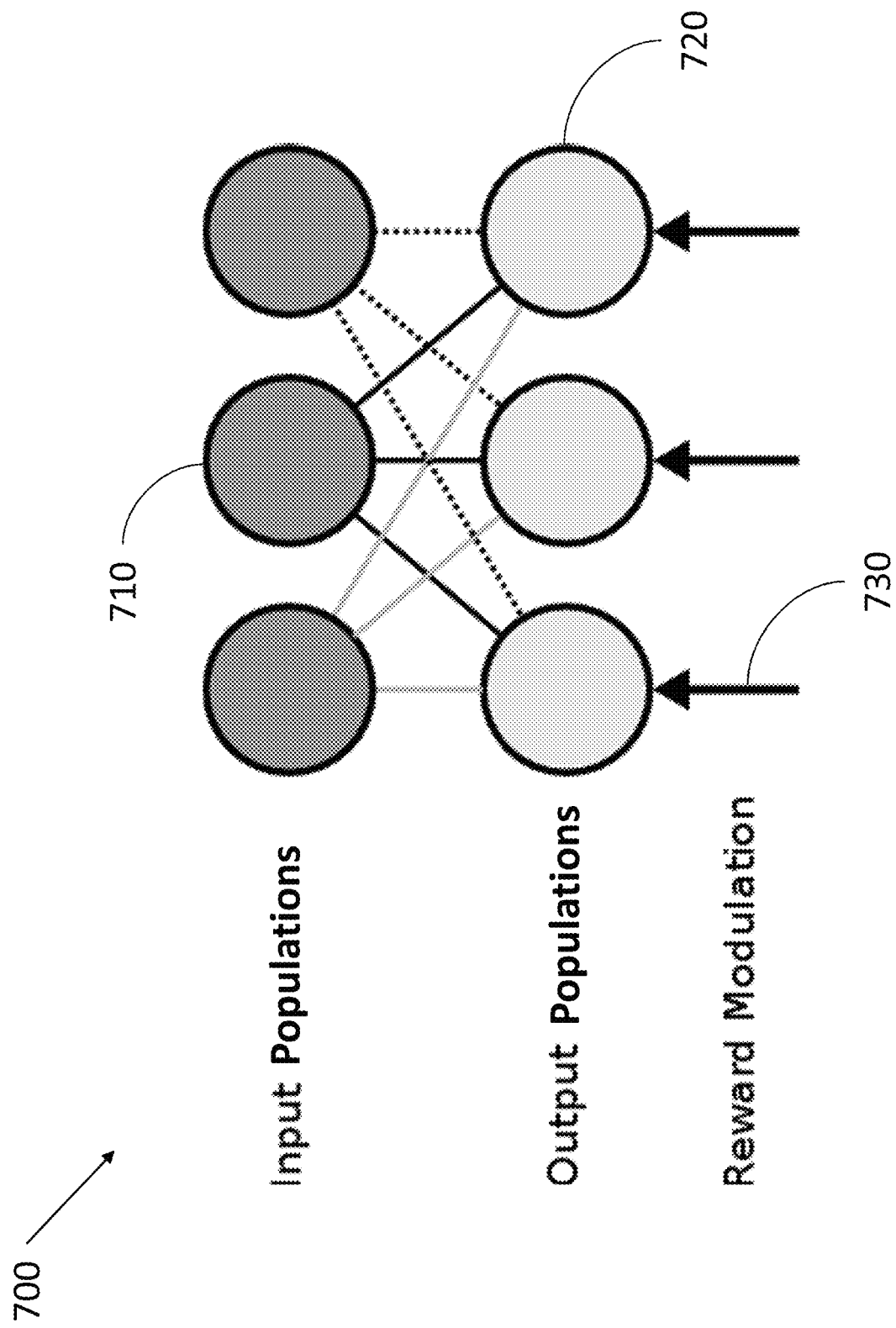
FIG. 7 is a schematic diagram illustrating an example feed-forward plastic network according to an embodiment of the present invention.

FIG. 7 is a schematic diagram illustrating an example feed-forward plastic network 700 according to an embodiment of the present invention.

The example network 700 of FIG. 7 is a three-channel version of a network. Each input population 710 may be randomly connected to each of the output populations 720. The reward modulation 730 may be controlled through the injection of correlated and uncorrelated spiking activity.

With further reference to FIG. 7, according to an embodiment of the neuromorphic hardware emulator, a simple feed-forward network model 700 may be created. The network 700 may include three layers of neurons: inputs 710, outputs 720, and reward modulators 730. These may be separated to create function channels, for example, ten such function channels. The input channels may be randomly connected to all of the output channels. Because the number of presynaptic neurons may be limited (e.g., to 16), it may not be a fully connected network. FIG. 7 illustrates the connectivity of the network 700 for only 3 channels.

Figure 8:
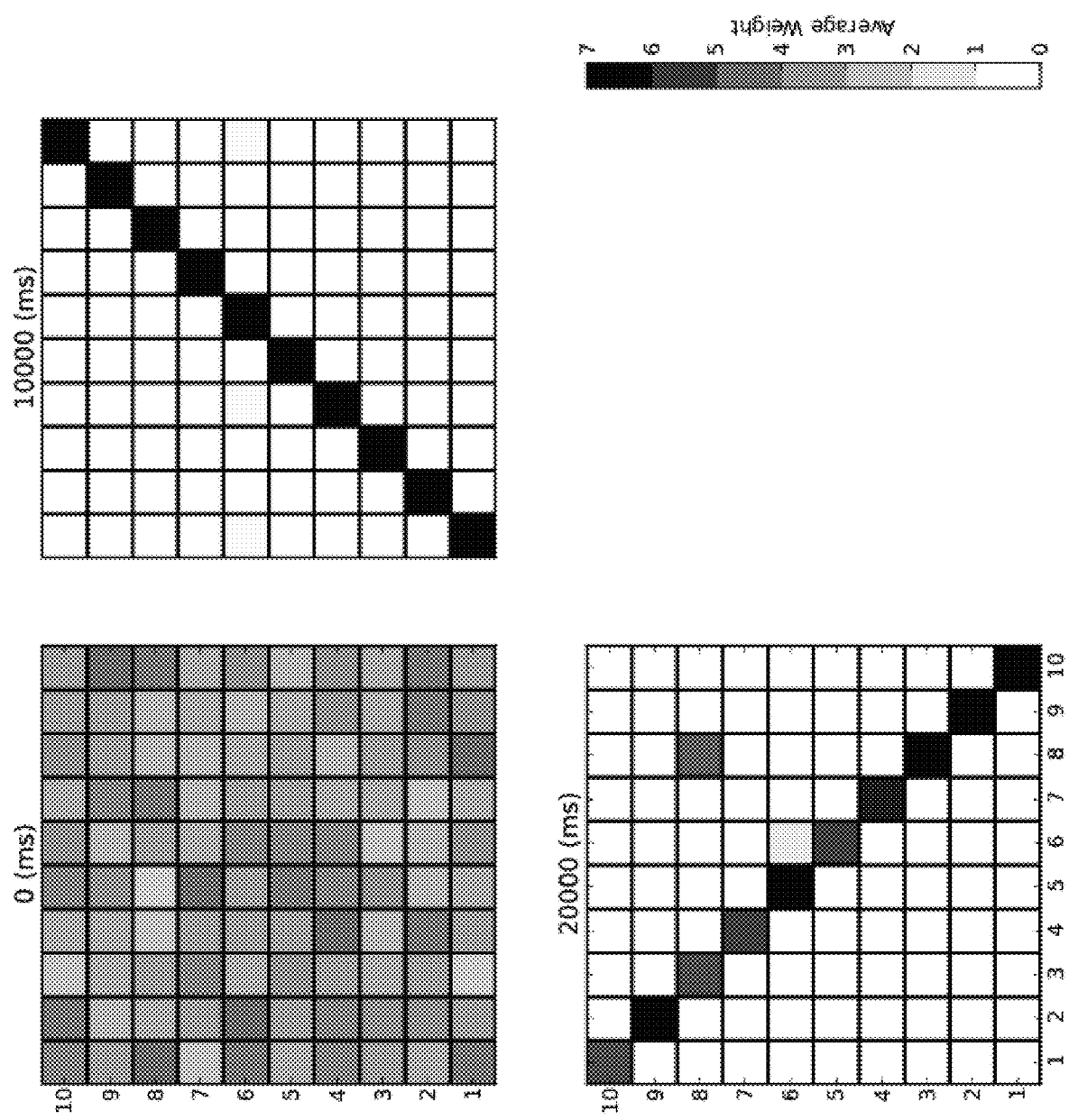
FIG. 8 is a set of graphs illustrating example synaptic weights in an example network according to an embodiment of the present invention.

FIG. 8 is a set of graphs illustrating example synaptic weights in an example network according to an embodiment of the present invention.

Referring to FIG. 8, these plots show the average synaptic weights between input populations (x-axis) and output populations (y-axis), with black representing the maximum weight (e.g., 7), white representing the minimum weight (e.g., 0), and shades of gray from light to dark representing the other weights (e.g., from 1 to 6). In the upper left, the synaptic weights may be initially randomly distributed. As shown in the upper right, after a period of reward inputs, the network may be driven to establish stronger weights for any input/output pairs, in this case a one-to-one relationship (each input population being paired with its corresponding same-numbered output population. In addition, as illustrated in the lower left, the network may be further driven, through reward modulation, into establishing a different set of input/output pairings; in this case a different one-to-one correspondence.

Figure 9:
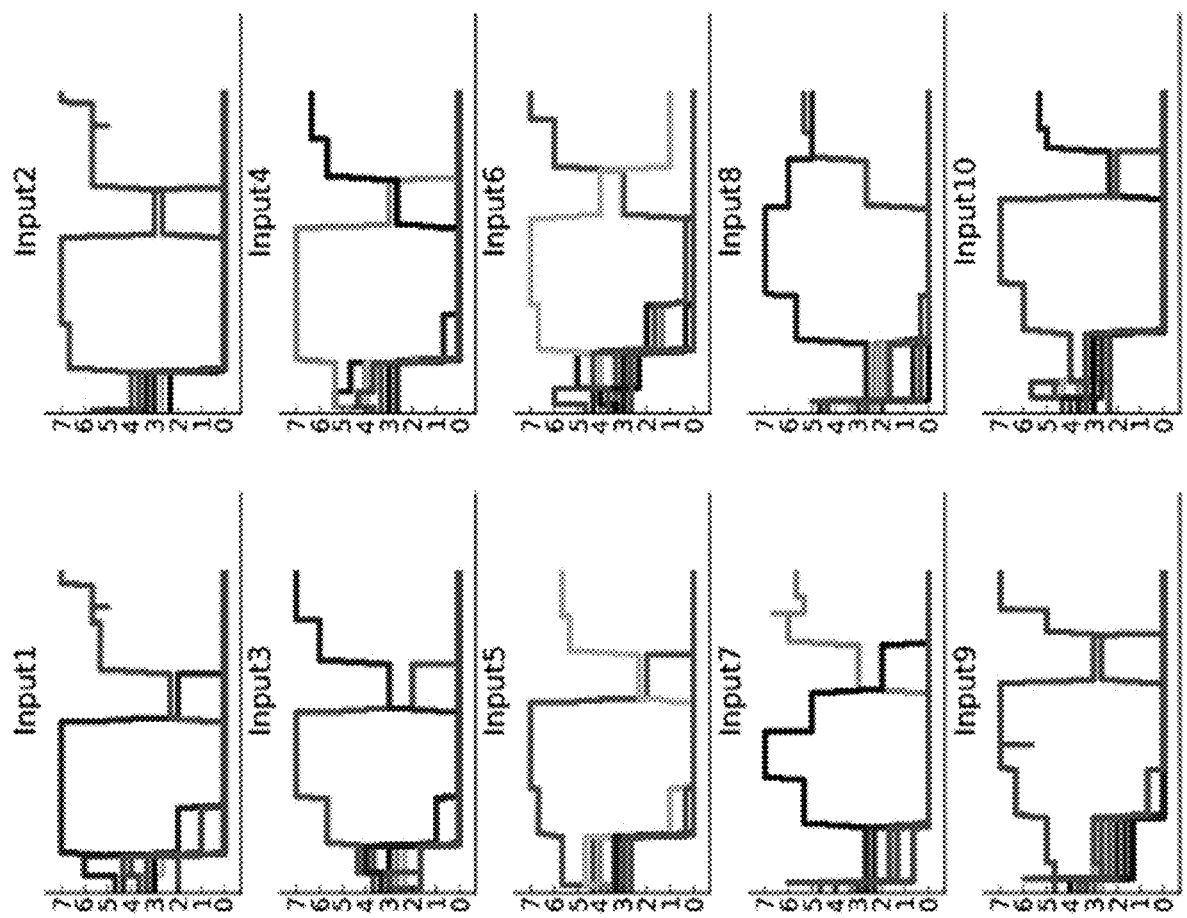
FIG. 9 is a set of color graphs illustrating example synaptic weight dynamics in an example network according to an embodiment of the present invention.

FIG. 9 is a set of color timeline graphs illustrating example synaptic weight dynamics in an example network according to an embodiment of the present invention.

Referring to FIG. 9, synaptic weight dynamics are shown in the example network using the same data for which three different snapshots are illustrated in FIG. 8. In FIG. 9, however, each input population may be represented with a different graph, while each of the 10 output populations may be depicted as a different color line within each of the graphs. For each of the input populations the average synaptic weights between the output populations is plotted. It should be noted that for each one a single line is high after an initial training period. This line is then reduced and a new channel is driven up.

The relationship between the data represented in FIG. 9 and that represented in FIG. 8 may be described as follows. Initially (e.g., time=0), the weights are randomly distributed (e.g., between 2 and 5) between each of the different combinations of input and output populations. This corresponds to the upper left diagram in FIG. 8. After directing each input population to the same-numbered output population (at about 40% of the way along the timelines in FIG. 9), the weights have completely polarized (7 for each corresponding pair, 0 for all of the others), which corresponds to the upper right diagram in FIG. 8. Finally, at the end of the timelines in FIG. 9, each of the input populations has been directed to a different one of the output populations, which corresponds to the lower left diagram of FIG. 8.

Accordingly, despite the limited connectivity in the network, it may still be capable of establishing arbitrary input/output pairs based on the reward modulation. In addition, these pairs may be fully plastic and the network may be driven to change pairings based on the input. FIGS. 8 and 9 illustrate how one set of input/output pairs may be created and then replaced by a different set of associations. It is important to note that initially these may be randomly connected and there may be no intentional bias between channels.

Figure 10:
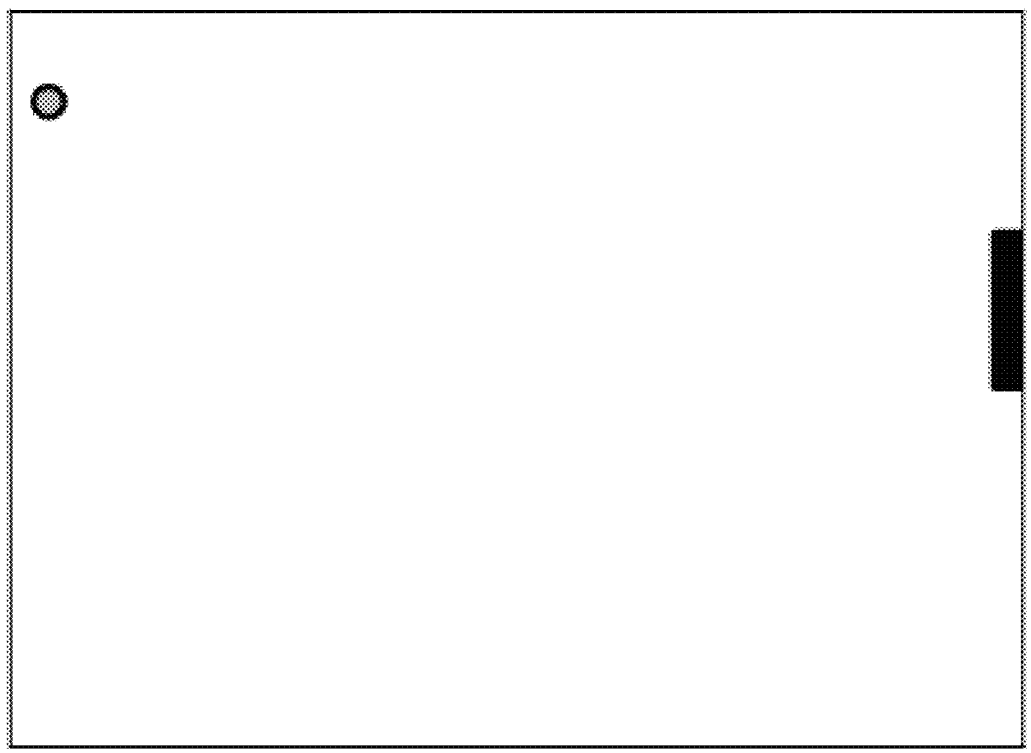
FIG. 10 is an illustration of an example pong game board according to an embodiment of the present invention.

FIG. 10 is an illustration of an example Pong game board according to an embodiment of the present invention.

As shown above, example emulated neuromorphic hardware networks may be immersed into different virtual environments and through feedback they may learn to operate effectively. In the embodiment of FIG. 10, a pong environment is interfaced through Python directly to an example emulator. The game space may be discretized and the control of the paddle may be through a winner-take-all spike count mechanism. FIG. 10 is a visualization of the game board and playing components.

Figure 11:
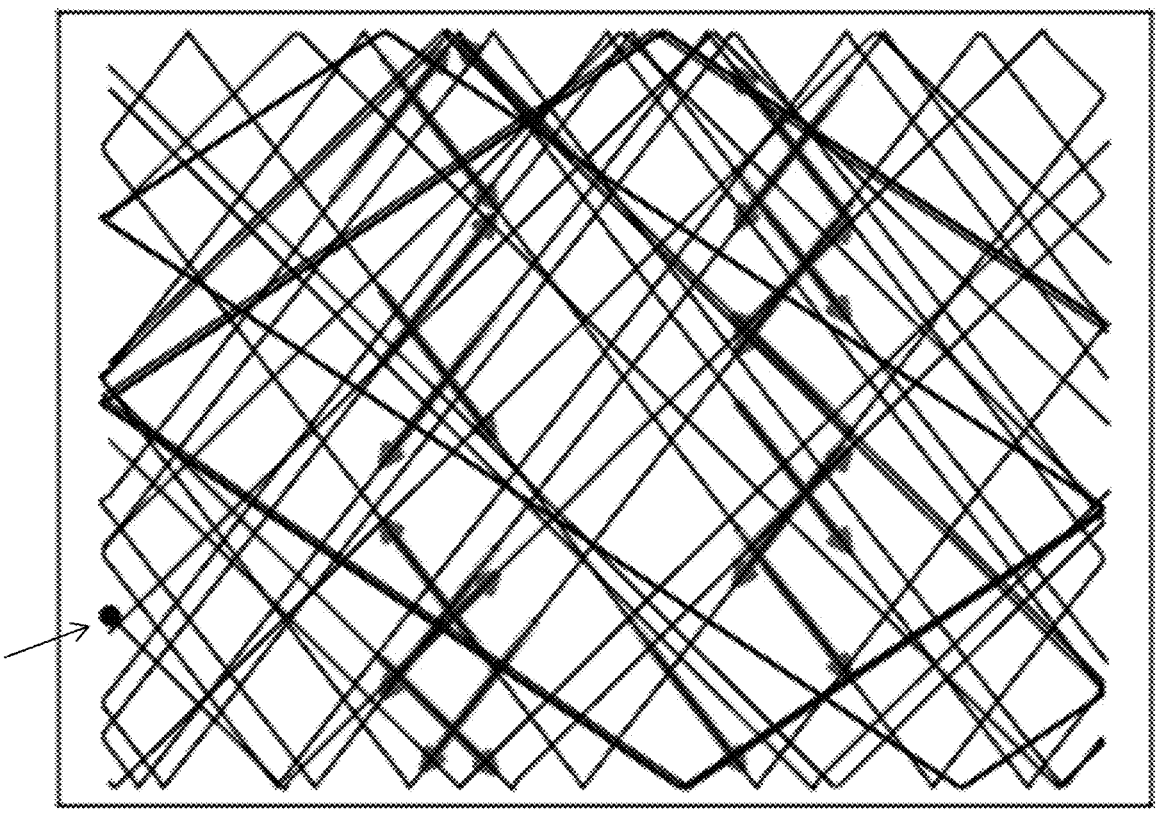
FIG. 11 is an illustration of an example pong game play according to an embodiment of the present invention.

FIG. 11 is an illustration of an example pong game play according to an embodiment of the present invention.

Referring to FIG. 11, the grayed out lines indicate the puck trajectory during the initial phases of game play; corresponding to the period where the network learns to play the game. The black line is a continuous volley after the appropriate pairs are established. Note that the circle (pointed to by the arrow) indicates the starting point of the extended volley.

Figure 12:
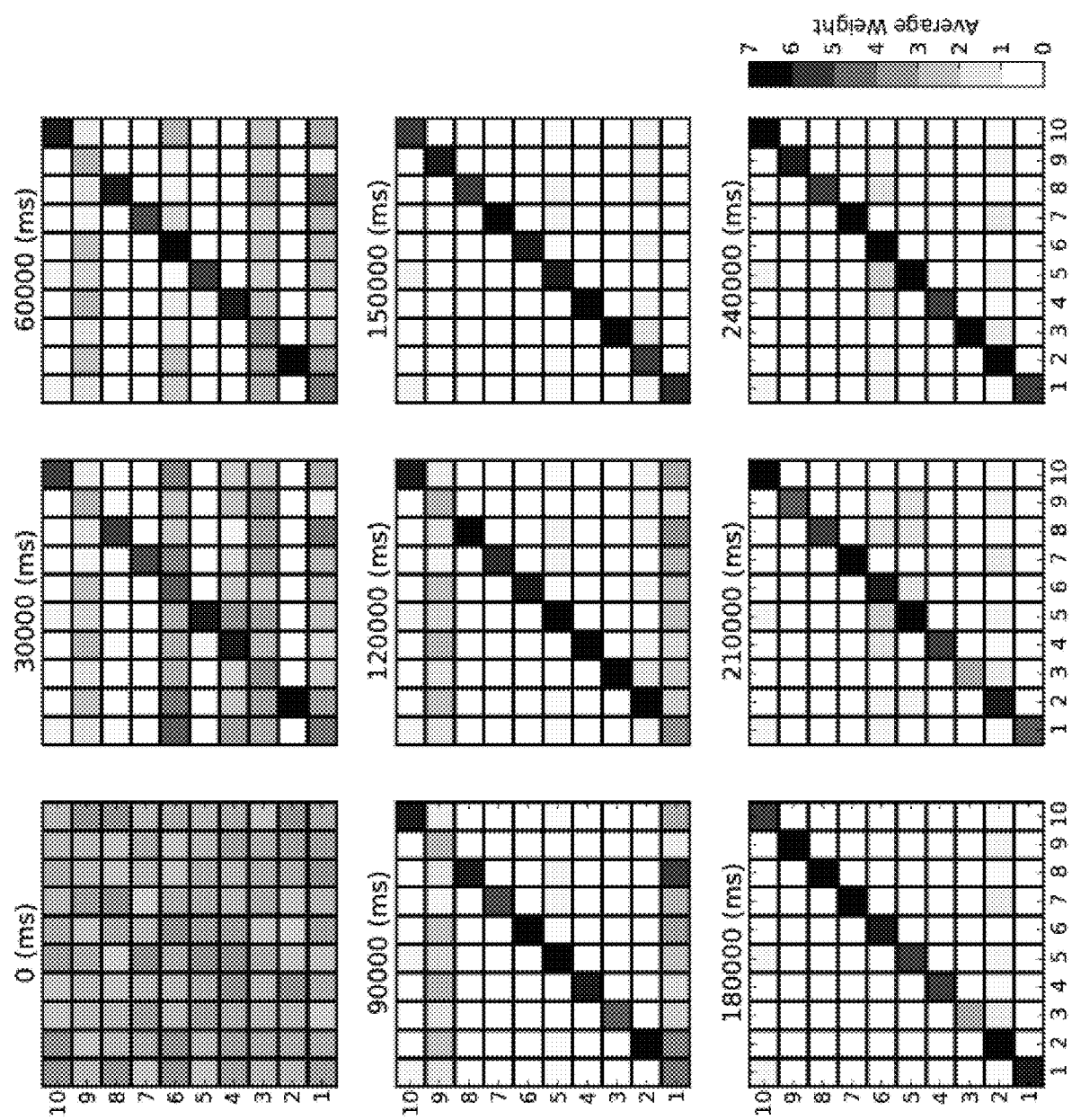
FIG. 12 is a set of graphs of example synaptic weights in a pong-playing network according to an embodiment of the present invention.

FIG. 12 is a set of graphs of example synaptic weights in a pong-playing network according to an embodiment of the present invention.

The graphs are taken at different simulated times, 30 seconds apart. As may be seen over the four minute simulated time period of the experiment (from upper left to lower right of FIG. 12), the longer the network plays and receives feedback the stronger the input/output pairings become.

Figure 13:
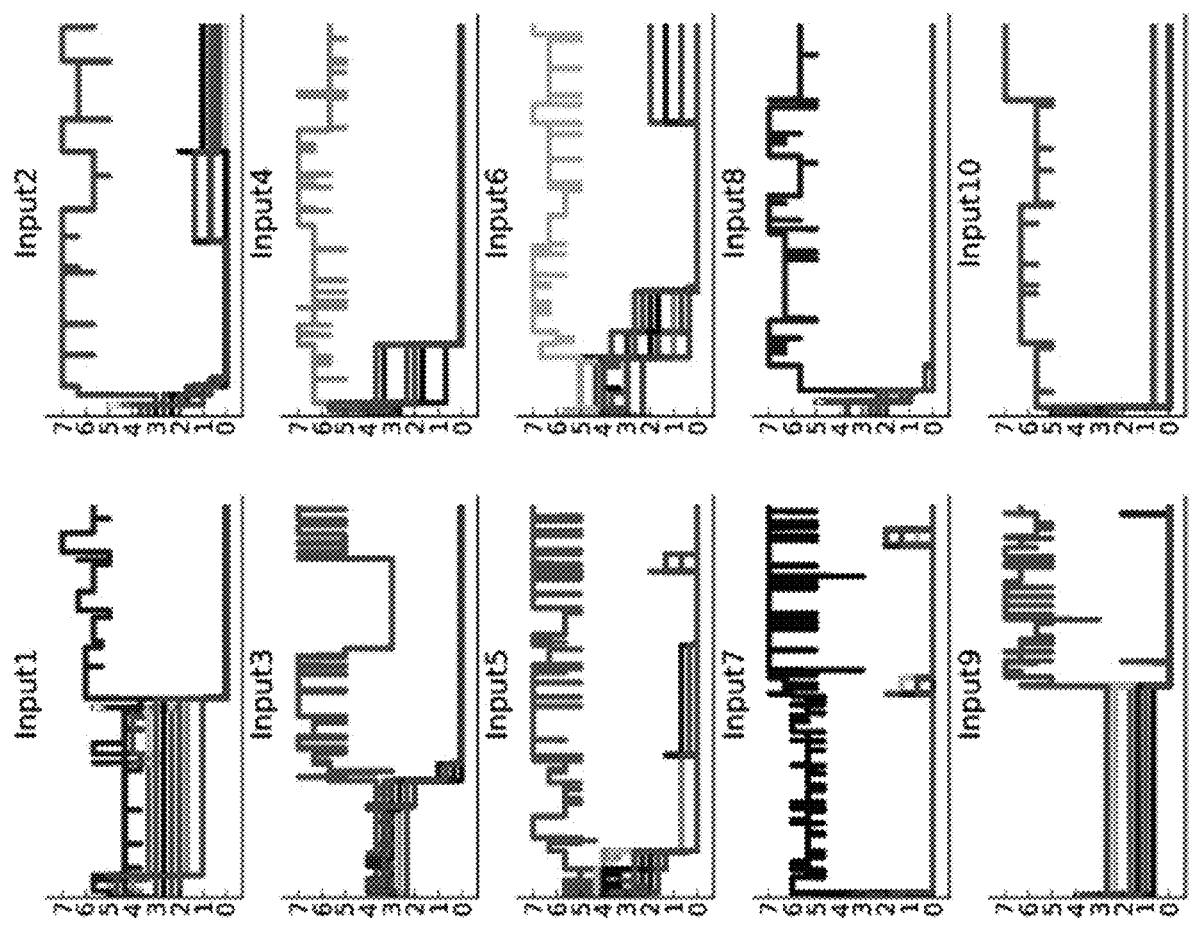
FIG. 13 is a set of color graphs of example synaptic weight dynamics in a pong-playing network according to an embodiment of the present invention.

FIG. 13 is a set of color graphs of example synaptic weight dynamics in a pong-playing network according to an embodiment of the present invention.

Referring to FIG. 13, synaptic weight dynamics are shown in the example network using the same data used in the nine different snapshots illustrated in FIG. 12. The color graphs of FIG. 13 are similarly coded to (and similarly described as) the color graphs of FIG. 9 above. As the network plays the average synaptic weights between pairs may be established.

Referring to the embodiment of FIGS. 11-13, during gameplay the network may receive feedback through the reward modulation channels whenever the ball reaches the bottom of the game board. This modulation drives the activity of the network to establish input/output pairs that favor a direct tracking of the puck. Initially, as in the example above, the network appears unable to perform the task. Eventually the desired pairs may be established and the network may play the game effectively. FIG. 11 highlights the path of the puck after the network has learned to play. This is a continuous volley that lasts until the simulation ends. FIGS. 12-13 illustrate the evolution of the synaptic connections as the network learns the task.

Figure 14:
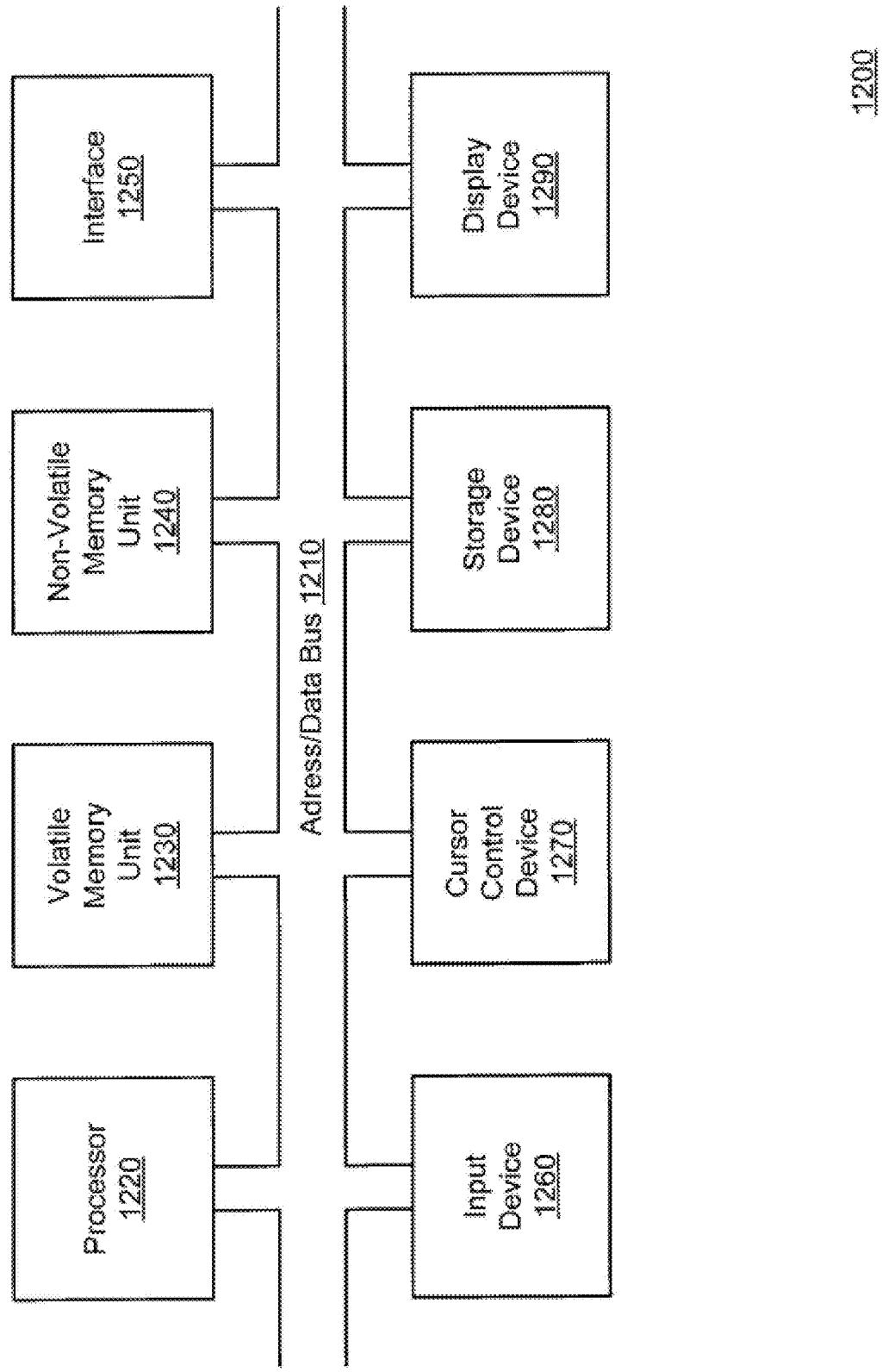
FIG. 14 is a block diagram of an example computer system according to an embodiment of the present invention.

FIG. 14 is a block diagram of an example computer system 1200 according to an embodiment of the present invention.

The computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of the computer system 1200. When executed, the instructions cause the computer system 1200 to perform specific actions and exhibit specific behavior, such as described herein. For example, the software program may be written in a high level language such as Python or C++, and compiled for execution on the processors of the computer system 1200, but the present invention is not limited thereto. For example, in other embodiments, the software may be written in a different programming language, such as a high level language and, more particularly, an object oriented language, as would be apparent to one of ordinary skill.

The computer system 1200 may include an address/data bus 1210 that is configured to communicate information. Additionally, one or more data processing unit, such as processor 1220, are coupled with address/data bus 1210. Processor 1220 is configured to process information and instructions. In an embodiment, processor 1220 is a microprocessor. In other embodiments, processor 1220 may be a different type of processor such as a parallel processor, or a field programmable gate array.

The computer system 1200 is configured to utilize one or more data storage units. The computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processor 1220. The computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processor 1220. In another embodiment, the computer system 1200 may execute instructions retrieved from an online data storage unit such as in "Cloud" computing. In an embodiment, the computer system 1200 also may include one or more interfaces, such as interface 1250, coupled with address/data bus 1210. The one or more interfaces are configured to enable the computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. In other embodiments, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In another embodiment, cursor control device 1270 is configured to be directed or guided by voice commands.

In an embodiment, the computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

The computer system 1200 is presented herein as an example computing environment in accordance with an embodiment. However, the computer system 1200 is not strictly limited to being a computer system. For example, an embodiment provides that the computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one embodiment, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for emulation of a neuromorphic hardware on a computer processor, the neuromorphic hardware comprising computing circuits, the computing circuits comprising neurons and synapses connecting the neurons, the neurons being configured to communicate to each other through the synapses via spikes, the computing circuits being configured to execute in parallel at a first clock rate defining first time increments, the method comprising, for each said first time increment:

emulating processing of the synapses at a second clock rate defining second time increments, the second clock rate being different from the first clock rate, the processing of the synapses comprising:
      receiving previous ones of the spikes at presynaptic ends of the synapses; and
      transmitting the received previous ones of the spikes to postsynaptic ends of the synapses;
   emulating processing of the neurons, the processing of the neurons comprising:
      receiving current ones of the spikes from the postsynaptic ends of a subset of the synapses, the subset having a size in accordance with a ratio between the first clock rate and the second clock rate, the size of the subset being smaller than a total number of the synapses;
      generating next ones of the spikes based on integrating, over the first time increment, the received current ones of the spikes; and
      transmitting the next ones of the spikes to the presynaptic ends of the synapses; and
   recording by the computer processor the next ones of the spikes for a subset of the neurons on a non-transitory physical medium.

2. The method of claim 1, further comprising, for each said first time increment, calling by the computer processor a user defined output function.

3. The method of claim 1, wherein
   the synapses comprise weights,
   the receiving of the current ones of the spikes further comprises receiving the weights of corresponding ones of the synapses,
   the generating of the next ones of the spikes is further based on the received weights,
   the processing of the synapses further comprises reweighting the synapses based on the previous and the next ones of the spikes, and the method further comprises, for each said first time increment, recording by the computer processor the weights of the synapses for the subset of the synapses on the non-transitory physical medium.

4. The method of claim 3, wherein the reweighting of the synapses comprises:
inhibiting the weights of the synapses that receive the previous ones of the spikes and whose said neurons generated the next ones of the spikes for the previous said first time increment; and
potentiating the weights of the synapses whose said weights contribute to the generating of the next ones of the spikes.

5. The method of claim 3, wherein the generating of the next ones of the spikes comprises summing the received weights.

6. The method of claim 5, wherein the generating of the next ones of the spikes further comprises adding, to the summed received weights, a previous said summed received weights multiplied by a decay factor.

7. The method of claim 6, wherein the decay factor is fixed.

8. A system for emulation of a neuromorphic hardware, the neuromorphic hardware comprising computing circuits, the computing circuits comprising neurons and synapses connecting the neurons, the neurons being configured to communicate to each other through the synapses via spikes, the computing circuits being configured to execute in parallel at a first clock rate defining first time increments, the system comprising:
a processor; and
a non-transitory physical medium, wherein the medium has instructions stored thereon that, when executed by the processor, causes the processor to, for each said first time increment:
emulate processing of the synapses at a second clock rate defining second time increments, the second clock rate being different from the first clock rate, the processing of the synapses comprising:
receiving previous ones of the spikes at presynaptic ends of the synapses; and
transmitting the received previous ones of the spikes to postsynaptic ends of the synapses;
emulate processing of the neurons, the processing of the neurons comprising:
receiving current ones of the spikes from the postsynaptic ends of a subset of the synapses, the subset of the synapses having a size in accordance with a ratio between the first clock rate and the second clock rate, the size of the subset being smaller than a total number of the synapses;
generating next ones of the spikes based on integrating, over the first time increment, the received current ones of the spikes; and
transmitting the next ones of the spikes to the presynaptic ends of the synapses; and
record the next ones of the spikes for a subset of the neurons on the non-transitory physical medium.

9. The system of claim 8, wherein the instructions, when executed by the processor, further cause the processor to, for each said first time increment, call a user defined output function.

10. The system of claim 8, wherein
the synapses comprise weights,
the receiving of the current ones of the spikes further comprises receiving the weights of corresponding ones of the synapses,
the generating of the next ones of the spikes is further based on the received weights,
the processing of the synapses further comprises reweighting the synapses based on the previous and the next ones of the spikes, and
the instructions, when executed by the processor, further cause the processor to, for each said first time increment, record the weights of the synapses for the subset of the synapses on the non-transitory physical medium.

11. The system of claim 10, wherein the reweighting of the synapses comprises:
inhibiting the weights of the synapses that receive the previous ones of the spikes and whose said neurons generated the next ones of the spikes for the previous said first time increment; and
potentiating the weights of the synapses whose said weights contribute to the generating of the next ones of the spikes.

12. The system of claim 10, wherein the generating of the next ones of the spikes comprises summing the received weights.

13. The system of claim 12, wherein the generating of the next ones of the spikes further comprises adding, to the summed received weights, a previous said summed received weights multiplied by a decay factor.

14. The system of claim 13, wherein the decay factor is fixed.

* * * * *